(12) United States Patent
Miyachi et al.

(10) Patent No.: US 7,724,335 B2
(45) Date of Patent: May 25, 2010

(54) DISPLAY DEVICE PRODUCING DISPLAY BY CHANGING SHAPE OF REFRACTIVE INDEX ELLIPSOID OF MEDIUM BY APPLYING ELECTRIC FIELD TO MEDIUM

(75) Inventors: Koichi Miyachi, Soraku-gun (JP); Seiji Shibahara, Tenri (JP); Iichiro Inoue, Tenri (JP); Shoichi Ishihara, Katano (JP); Akihito Jinda, Kitakatsuragi-gun (JP); Kiyoshi Ogishima, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 789 days.

(21) Appl. No.: 11/037,546

(22) Filed: Jan. 19, 2005

(65) Prior Publication Data

US 2005/0185105 A1   Aug. 25, 2005

(30) Foreign Application Priority Data

Jan. 20, 2004 (JP) ............................. 2004-012214
Jan. 18, 2005 (JP) ............................. 2005-010823

(51) Int. Cl.
 G02F 1/1343 (2006.01)
 G02F 1/137 (2006.01)
 G02F 1/07 (2006.01)
 G02F 1/03 (2006.01)

(52) U.S. Cl. .................... 349/141; 349/40; 349/161; 349/167; 359/322

(58) Field of Classification Search .................. 349/40, 349/141, 161, 167, 169; 359/322–324
See application file for complete search history.

(56) References Cited

U.S. PATENT DOCUMENTS

| 5,870,160 | A |   | 2/1999 | Yanagawa et al. |
| 5,907,379 | A | * | 5/1999 | Kim et al. ............ 349/141 |
| 6,034,757 | A |   | 3/2000 | Yanagawa et al. |
| 6,108,066 | A |   | 8/2000 | Yanagawa et al. |
| 6,111,627 | A | * | 8/2000 | Kim et al. ............ 349/141 |
| 6,147,738 | A |   | 11/2000 | Okamoto |

(Continued)

FOREIGN PATENT DOCUMENTS

CN          2534609 Y      2/2003

(Continued)

OTHER PUBLICATIONS

Matsumoto et al, Fine Droplets of Liquid Crystals in a Transparent Polymer and Their Response, Appl. Phys. Lett., 69, 1996, pp. 1044-1046.

(Continued)

*Primary Examiner*—Andrew Schechter
(74) *Attorney, Agent, or Firm*—Nixon & Vanderhye PC

(57) ABSTRACT

A display element according to the present invention is provided with a pair of substrates, at least one of which is transparent; a medium between the substrates, wherein optical anisotropy magnitude of the medium is changeable by and according to an electric field applied thereon; at least one pair of electrodes for applying, on the medium, the electric field substantially parallel to the substrates; and a shielding electrode overlapping at least a display portion of at least one of the substrates, and used for shielding the display element from static electricity.

35 Claims, 13 Drawing Sheets

U.S. PATENT DOCUMENTS

| | | | |
|---|---|---|---|
| 6,166,795 | A | 12/2000 | Fujii et al. |
| 6,191,837 | B1 | 2/2001 | Fujimaki et al. |
| 6,215,542 | B1 | 4/2001 | Lee et al. |
| 6,233,034 | B1 | 5/2001 | Lee et al. |
| 6,266,109 | B1 * | 7/2001 | Yamaguchi et al. ........... 349/86 |
| 6,266,117 | B1 | 7/2001 | Yanagawa et al. |
| 6,327,013 | B1 | 12/2001 | Tombling et al. |
| 6,346,932 | B1 | 2/2002 | Maeda |
| 6,469,765 | B1 | 10/2002 | Matsuyama et al. |
| 6,525,786 | B1 | 2/2003 | Ono |
| 6,556,263 | B2 | 4/2003 | Gu |
| 2001/0024184 | A1 | 9/2001 | Maeda |
| 2001/0028424 | A1 | 10/2001 | Maeda |
| 2001/0038432 | A1 | 11/2001 | Yanagawa et al. |
| 2001/0048501 | A1 | 12/2001 | Kim et al. |
| 2002/0054267 | A1 | 5/2002 | Matsumoto et al. |
| 2002/0140649 | A1 | 10/2002 | Aoyama et al. |
| 2004/0125255 | A1 | 7/2004 | Yanagawa et al. |
| 2005/0041196 | A1 | 2/2005 | Ishihara et al. |
| 2005/0105009 | A1 * | 5/2005 | Dunn et al. ................... 349/21 |
| 2005/0140620 | A1 | 6/2005 | Aoyama et al. |
| 2005/0151911 | A1 | 7/2005 | Kim et al. |
| 2005/0151912 | A1 | 7/2005 | Miyachi et al. |
| 2005/0162607 | A1 | 7/2005 | Miyachi et al. |
| 2005/0168663 | A1 | 8/2005 | Miyachi et al. |
| 2005/0179632 | A1 | 8/2005 | Miyachi et al. |
| 2005/0179847 | A1 | 8/2005 | Miyachi et al. |
| 2005/0185105 | A1 | 8/2005 | Miyachi et al. |
| 2005/0185125 | A1 | 8/2005 | Miyachi et al. |
| 2005/0185131 | A1 | 8/2005 | Miyachi et al. |
| 2005/0225692 | A1 | 10/2005 | Yanagawa et al. |
| 2005/0237472 | A1 | 10/2005 | Shibahara et al. |
| 2006/0290862 | A1 | 12/2006 | Yanagawa et al. |
| 2007/0070282 | A1 * | 3/2007 | Shibahara et al. ........... 349/141 |
| 2007/0080370 | A1 | 4/2007 | Miyachi et al. |
| 2008/0024711 | A1 | 1/2008 | Yanagawa et al. |
| 2008/0129929 | A1 | 6/2008 | Miyachi et al. |

FOREIGN PATENT DOCUMENTS

| | | |
|---|---|---|
| JP | 7-56545 | 3/1995 |
| JP | 08-184854 | 7/1996 |
| JP | 9-243984 | 9/1997 |
| JP | 09-269504 | 10/1997 |
| JP | 09-269507 | 10/1997 |
| JP | 10-133205 | 5/1998 |
| JP | 10-319434 | 12/1998 |
| JP | 11-125832 | 5/1999 |
| JP | 11-183937 A | 7/1999 |
| JP | 2001-249363 A | 9/2001 |
| JP | 2003-075819 | 3/2003 |
| JP | 2005-215339 A | 8/2005 |
| KR | 1999-0051849 | 7/1999 |
| KR | 10-2001-0039664 | 5/2001 |
| WO | WO97/10530 | 3/1997 |
| WO | WO97/34188 | 9/1997 |
| WO | WO2005/069064 | 7/2005 |

OTHER PUBLICATIONS

Mizoshita et al, "Fast and High-Contrast Electro-Optical Switching of Liquid Crystalline Physical Gels" Formation of Oriented Microphase-Separated Structures, Adv. Funct. Mater., vol. 13, No. 4, Apr. 2003, pp. 313-317.

Saito et al, "Thermodynamics of a Unique Thermo-Tropic Liquid Crystal Having Optical Isotropy", Ekisho, Vo. 5, No. 1, 2001, pp. 20-27 w/partial English Translation.

Yamamoto, "Liquid Crystal Micro Emulsion", Ekisho, vol. 4, No. 3, 2000, pp. 248-254 (partial English Translation).

Shiraishi et al, "Kobunshi Ronbunshu", vol. 59, No. 12, Dec. 2002, pp. 753-759 (partial English Translation).

Kikuchi et al, "Polymer-Stabilized Liquid Crystal Blue Phases", Nature Materials, vol. 1, Sep. 2002 pp. 64-68.

Yoneya, "Examining Nano-Structured Liquid Crystal Phase by Molecule simulator", Ekisho, vol. 7, No. 3, 2003, pp. 238-245 (partial English Translation).

Demus et al, "Handbook of Liquid Crystals Low Molecular Weight Liquid Crystal", Wiley-VCH, vol. 2B, 1998, pp. 887-900.

Demus et al, Handbook of Liquid Crystals, vol. 1: Fundamentals, 1998, pp. 484-485 & 530.

Grelet et al, "Structural Investigations on Smectic Blue Phases", Physical Review Letters, vol. 86, No. 17, pp. 3791-3794.

Yamamoto, "First Lecture of Liquid Crystal Science Experiment: Identification of Liquid Crystal Phase", Lyotropic Liquid Crystal, Ekisho, vol. 6, No. 1, 2002, pp. 72-83 (partial English Translation).

Yamamoto et al, "Organic Electrooptic Materials", National Technical Report, vol. 22, No. 6, Dec. 1976, pp. 826-834 (partial English Translation).

International Search Report for PCT/JP2005/000944 dated May 17, 2005.

Diele et al, "Chapter XIII Thermotropic Cubic Phases", Handbook of Liquid Crystals Low Molecular Weight Liquid Crystal, edited by Demus et al, Wiley-VCH, vol. 2B, 1998, pp. 887-900.

KR 1999-0004367 published Jan. 15, 1999 corresponds to U.S. 6,215,542 listed above.

JP11-52403 corresponds to US 6,166,795 listed above.

JP2002-31812 corresponds to US 2001/0048501 listed above.

JP9-105918 and JP 9-258203 corresponds to US 5,870,160; US 6,034,757; US 6,108,066 listed above.

JP10-96953 corresponds to US 6,191,837 listed above.

JP11-223827 corresponds to US 6,147,738 listed above.

JP11-352504 corresponds to US 6,327,013 listed above.

JP2001-147441 corresponds to US 6,525,786 listed above.

JP2002-148634 corresponds to US 2002/0054267 listed above.

Office Action dated Feb. 23, 2010 in related U.S. Appl. No. 11/523,744, filed Sep. 20, 2006.

* cited by examiner

FIG. 10
GENERAL VIEW OF AGGLOMERATIONS | PACKING PARAMETER
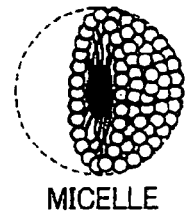 MICELLE  <1/3
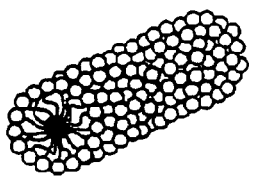 ROD-LIKE MICELLE  <1/2
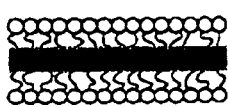 BILAYER MEMBRANE  ~1
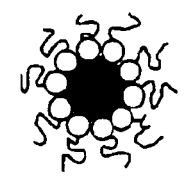 REVERSE MICELLE  >1
SPATIAL PACKING AND PHASES
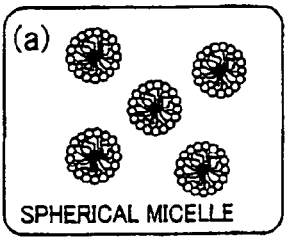 (a) SPHERICAL MICELLE
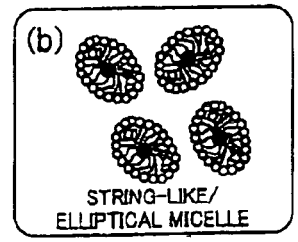 (b) STRING-LIKE/ELLIPTICAL MICELLE
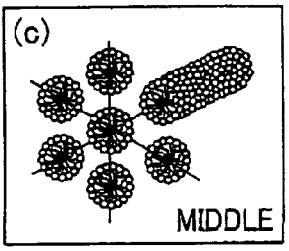 (c) MIDDLE
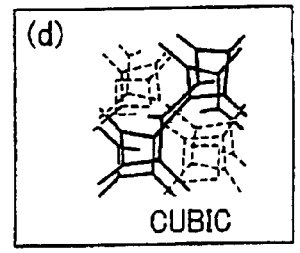 (d) CUBIC
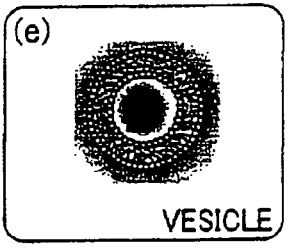 (e) VESICLE
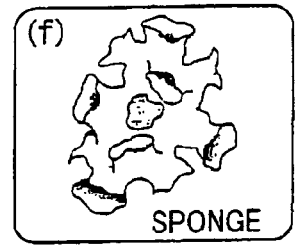 (f) SPONGE
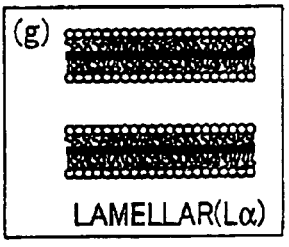 (g) LAMELLAR(Lα)
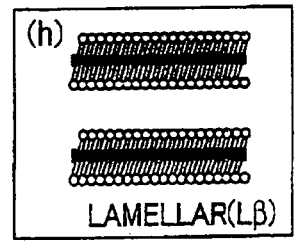 (h) LAMELLAR(Lβ)
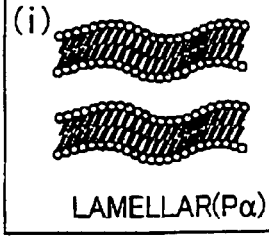 (i) LAMELLAR(Pα)
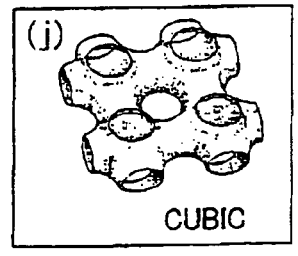 (j) CUBIC
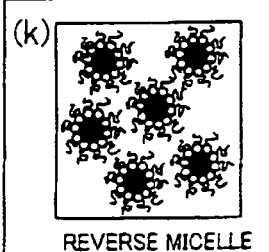 (k) REVERSE MICELLE
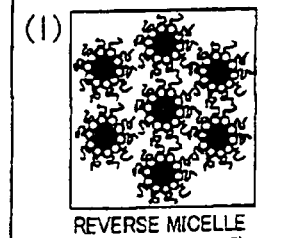 (l) REVERSE MICELLE (ORDERLY PHASE)

DISPLAY DEVICE PRODUCING DISPLAY BY CHANGING SHAPE OF REFRACTIVE INDEX ELLIPSOID OF MEDIUM BY APPLYING ELECTRIC FIELD TO MEDIUM

This Nonprovisional application claims priority under 35 U.S.C. § 119(a) on Patent Applications Nos. 2004-12214 and 2005-10823, respectively filed in Japan on Jan. 20, 2004 and Jan. 18, 2005, the entire contents of which are hereby incorporated by reference.

FIELD OF THE INVENTION

The present invention relates to a display element and display device having excellent display properties, including, e.g., high-speed response and wide-viewing angle.

BACKGROUND OF THE INVENTION

Liquid crystal display elements are advantaged over other display elements in terms of its thin thickness, light weight, and low power consumption. The liquid crystal display elements are widely used in image display apparatuses such as televisions, video cassette recorders, and the like, and OA (Office Automation) apparatuses such as monitors, word processors, personal computers, and the like.

Conventionally known liquid crystal display methods of the liquid crystal display elements include, for example, a TN (Twisted Nematic) mode in which a nematic liquid crystal is used, display modes in which FLC (Ferroelectric Liquid crystal) or AFLC (Antiferroelectric Liquid crystal) is used, a polymer dispersion type liquid crystal display mode, and other mode.

Among the liquid crystal display methods, for example, the TN (Twisted Nematic) mode in which the nematic liquid crystal is used is conventionally adopted in the liquid crystal display elements in practical use. The liquid crystal display elements using the TN mode have disadvantages of slow response, narrow viewing angle, and the other drawbacks. Those disadvantages are large hindrances for the TN mode to take over CRT (Cathode Ray Tube).

Moreover, the display modes in which the FLC or AFLC is used, are advantageous in their fast response and wide viewing angles, but significantly poor in anti-shock property and temperature characteristics. Therefore, the display modes in which the FLC or AFLC is used have not been widely used.

Further, the polymer dispersion type liquid crystal display mode, which utilizes scattering of light, does not need polarizer and is capable of providing a very bright display. However, in principle, the polymer dispersion type liquid crystal display mode cannot control the viewing angle by using a phase plate (retardation film). Further, the polymer dispersion type liquid crystal display mode has a problem in terms of the response property. Thus, the polymer dispersion type liquid crystal display mode is generally not as advantageous as the TN mode.

In all the foregoing display methods, liquid crystal molecules are oriented in a certain direction and thus a displayed image looks differently depending on an angle between a line of vision and the liquid crystal molecules. On this account, all these display methods have viewing angle limits. Moreover, all the display methods utilize rotation of the liquid crystal molecules, the rotation caused by application of an electric field on the liquid crystal molecules. Because the liquid crystal molecules are rotated in alignment all together, responses take time in all the display method. The display modes in which the FLC and the AFLC are used are advantageous in terms of response speed and viewing angle, but have a problem in that their alignment can be irreversibly destroyed by an external force.

In contrast to those display methods in which rotation of molecules by the application of the electric field is utilized, a display method in which the secondary electro-optical effect is utilized.

The electro-optical effect is a phenomenon in which a refractive index of a material is changed by an external electric field. There are two types of electro-optical effect: one is an effect proportional to the electric field and the other is proportional to the square of the electric field. The former is called the Pockels effect: the latter is called the Kerr effect. The Kerr effect was adopted early on in high-speed optical shutters, and has been practically used in special measurement instruments. The Kerr effect was discovered by J. Kerr in 1875. So far, organic liquid such as nitrobenzene, carbon disulfide, and the like, are known as material showing the Kerr effect. These materials are used, for example, in the aforementioned optical shutters, and the similar devices. Further, these materials are used, e.g. for measuring strength of high electric fields for power cables and the like, and similar usage.

Later on, it was found that liquid crystal materials have a large Kerr constant. Researches has been conducted to utilize the large Kerr constant of the liquid crystal materials for use in light modulation devices, light deflection devices, and further optical integrated circuit. It has been reported that some liquid crystal compound has a Kerr constant more than 200 times higher than that of nitrobenzene.

Under these circumstances, studies for using the Kerr effect in display apparatuses has begun. It is expected that the use of the Kerr effect attains a relatively low voltage driving because the Kerr effect is proportional to the square of the electric field. Further, it is expected that the utilization of the Kerr effect attains a high-speed response display apparatus (because, e.g., the Kerr effect shows a response property of several $\mu$ seconds to several m seconds, as its basic nature).

Under there circumstances, for instance, Patent document 1 (Publication of Japanese Patent Application, publication No. 2001-249363 (Tokukai 2001-249363; published on Sep. 14, 2001)) suggests a display element in which a medium made from a liquid crystalline material is sealed between a pair of substrates and the Kerr effect is induced by application of an electric field parallel or perpendicular to the substrates.

The inventors of the present invention found that display performed with the display element arranged truly as disclosed in Patent Document 1 has poor quality because static electricity cause the display uneven.

SUMMARY

An object of the present invention is to provide a display element and a display device, which are free from static electricity and thus are stable.

A display element has a pair of substrates, at least one of which is transparent; a medium between the substrates; at least one electrode pair on a principal plane of one of the substrates; and a third electrode provided on an other principal plane of the substrates than the principal plane on which the at least one electrode pair is provided, where the principal plane is a surface of one of the substrates but the other principal plane is any one of that surface of the one of the substrates and surfaces of the other one of the substrates. Optical anisotropy magnitude of the medium is changeable by and according to an electric field applied thereon. The at least one electrode pair has a first and a second electrodes for applying, on the medium, the electric field substantially parallel to the one of the substrates.

Moreover, a display element has a pair of substrates, at least one of which is transparent; a medium between the substrates; at least one pair of electrodes for applying, on the medium, the electric field substantially parallel to the substrates; and a shielding electrode. Optical anisotropy magnitude of the medium is changeable by and according to an electric field applied thereon. The shielding electrode overlaps at least a display portion of at least one of the substrates, and is used for shielding the display element from static electricity.

Here, by the wording "changeable in an optical anisotropy magnitude by and according to electric field application", it is meant that the magnitude of the optical anisotropy is changeable by and according to the electric field applied. More specifically, a shape of a refractive index ellipsoid is changeable by and according to the electric field applied. In other words, this display element can realize different display states by utilizing change in the shape of the refractive index ellipsoid depending whether the electric field is applied or not.

In other words, the refractive index in materials is not isotropic in general and differs depending on directions. This anisotropy in the refractive index, that is, optical anisotropy of the material is generally due to the refractive index ellipsoid. It is generally considered that a plane passing the original point and perpendicular to the traveling direction of the light wave is the cross section of the refractive index ellipsoid with respect to the light traveling in a certain direction. The major axial direction of the ellipsoid is the polarization component direction of the polarized light of the light wave. The half length of the major axis corresponds to the refractive index of that polarization component direction. When the optical anisotropy is discussed in terms of the refractive index ellipsoid, the different display states are realized in a conventional liquid crystal device by changing (rotating) a direction of a major axial direction of the refractive index ellipsoid of a liquid crystal molecule by application of electric field. Here, the shape (shape of cross section) of the refractive index ellipsoid is not changed (i.e. constantly ellipsoidal). On the other hand, in the present invention, the different display states are realized by changing the shape (shape of cross section) of the refractive index ellipsoid formed from molecules which the medium comprises.

As described above, in the conventional liquid crystal display element, the display operation is carried out by utilizing only the change in the orientational direction of the liquid crystal molecules due to rotation thereof caused by the electric field application. The liquid crystal molecules in alignment are rotated together in one direction. Thus, inherent viscosity of the liquid crystal largely affects response speed. On the other hand, these arrangements, in which the display is carried out by utilizing the change in the modulation of the optical anisotropy in the medium, is free from the problem that the inherent viscosity of the liquid crystal largely affects response speed, unlike the conventional liquid crystal display element. Thus, it is possible to realize high-speed response. Moreover, the high-speed response allows the display element to be used, for example, in a display device of the field sequential color mode.

Moreover, the conventional liquid crystal display element has a problem in that its driving temperature range is limited to temperatures near a phase transition point of a liquid crystal phase, and thus it requires a highly accurate temperature control. On the other hand, these arrangements only require that the medium be kept at temperatures at which the magnitude of the optical anisotropy is changeable by the application of the electric field. Thus, it is possible to easily perform the temperature control in these arrangements.

Moreover, with this arrangement, it is possible to realize a wider viewing angle property than in the conventional liquid crystal display element, because these arrangements utilize, for performing the display operation, the change in the magnitude of the optical anisotropy of the medium. On the other hand, the conventional liquid crystal display element utilizes, for performing the display operation, the change in the orientational direction of the liquid crystal.

In these arrangement, by the wording "the third electrode provided on the other principal plane of either one of the substrates than the principal plane on which the at least one electrode pair is provided", it is meant that an additional electrode is provided on that side of the substrate which is opposite to the side on which the first and second electrodes are provided. Further, for instance, the wording indicates that an additional electrode is provided on the other one of the substrates on which the first and second electrodes are not provided.

In these arrangements, the third electrode functions as a shielding electrode for shielding the display element from the static electricity. Therefore, the any one of the display elements are shielding from the static electricity. Thus, in the any one of the display elements, the medium does not respond to the static electricity and thus does not fluctuate the brightness. Hereby, the display unevenness due to the static electricity is eliminated. Thus, it is possible to refrain and prevent the deterioration in the display quality. Therefore, with these arrangements, it is possible to provide a display element which is free from static electricity and thus are stable.

Moreover, in order to attain the object, a display device is provided with any one of the display elements.

Therefore, with these arrangements, it is possible to provide a display device which has a wide driving temperature range, a wide viewing angle property, and a high-speed response property, and which is stable because the display element is shielded from the static electricity and thus is free from the influence from the static electricity. The display device is applicable as, for example, a display device of field sequential color mode.

BRIEF DESCRIPTION OF THE DRAWINGS

For a fuller understanding of the nature and advantages of the invention, reference should be made to the ensuing detailed description taken in conjunction with the accompanying drawings.

FIG. 6(*b*) is a cross-sectional view schematically illustrating the shape and the main axis direction of the typical refractive index ellipsoid of the medium in the display element illustrated in FIG. 6(*a*) when an electric field is applied to the medium.

FIG. 6(*c*) is a cross-sectional view schematically illustrating a shape and a main axis direction of a typical refractive index ellipsoid of a medium in a conventional TN mode liquid crystal display element when no electric field is applied to the medium.

FIG. 6(*d*) is a cross-sectional view schematically illustrating the shape and the main axis direction of the typical refractive index ellipsoid of the medium in the liquid crystal display element illustrated in FIG. 6(*c*) when an electric field is applied.

FIG. 6(*e*) is a cross-sectional view schematically illustrating a shape and a main axis direction of a typical refractive index ellipsoid of a medium in a conventional VA mode liquid crystal display element when no electric field is applied to the medium.

FIG. 6(*f*) is a cross-sectional view schematically illustrating the shape and the main axis direction of the typical refractive index ellipsoid of the medium in the liquid crystal display element illustrated in FIG. 6(*e*) when an electric field is applied to the medium.

FIG. 6(*g*) is a cross-sectional view schematically illustrating a shape and a main axis direction of a typical refractive index ellipsoid of a medium in a conventional IPS mode liquid crystal display element when no electric field is applied to the medium.

FIG. 6(*h*) is a cross-sectional view schematically illustrating the shape and the main axis direction of the typical refractive index ellipsoid of the medium in the liquid crystal display element illustrated in FIG. 6(*g*) when an electric field is applied to the medium.

FIG. 10 is a classification view of lyotropic liquid crystal phases.

DESCRIPTION OF THE EMBODIMENTS

A non-limiting example embodiment is described in reference to FIGS. 1 to 16.

Figure 1:
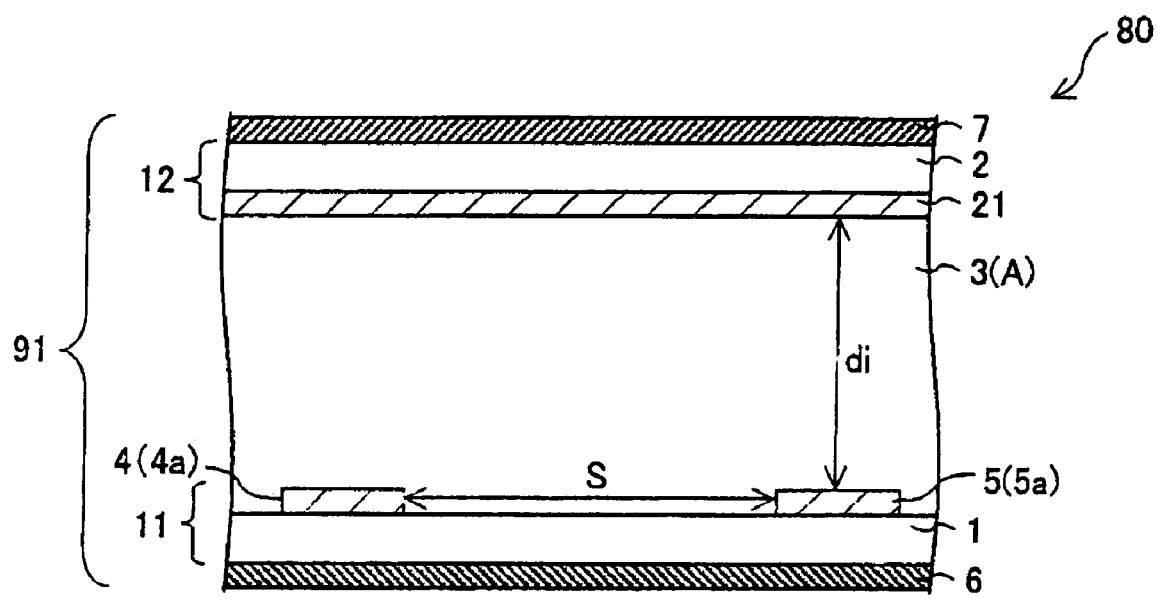
FIG. 1 is a cross-sectional view illustrating a schematic arrangement of various parts of a display element in accordance with one embodiment of the present invention.
Figure 2:
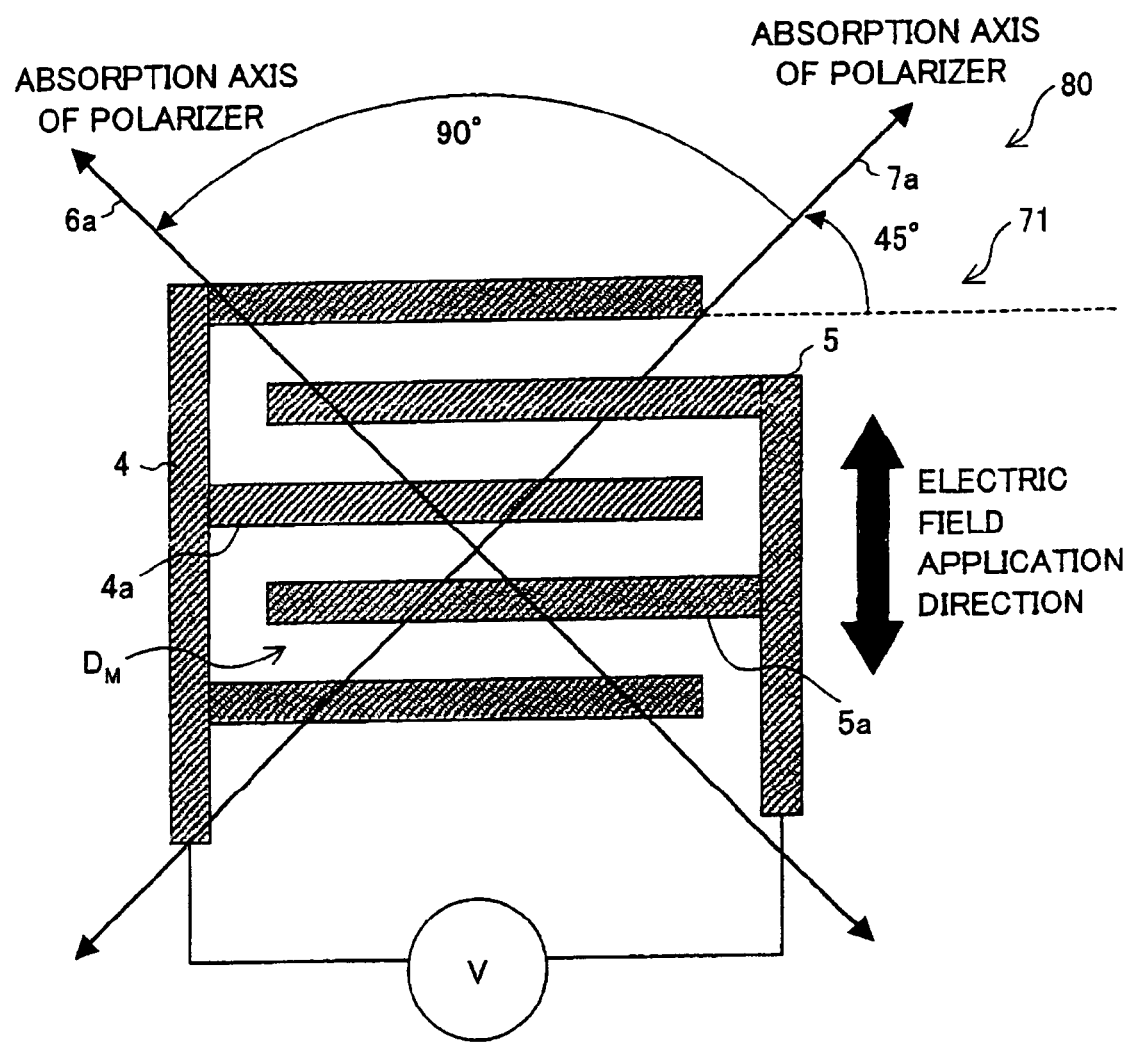
FIG. 2 is a view for explaining a relationship between an electrode structure and polarizing plate absorption axes in the display element illustrated in FIG. 1.
Figure 14:
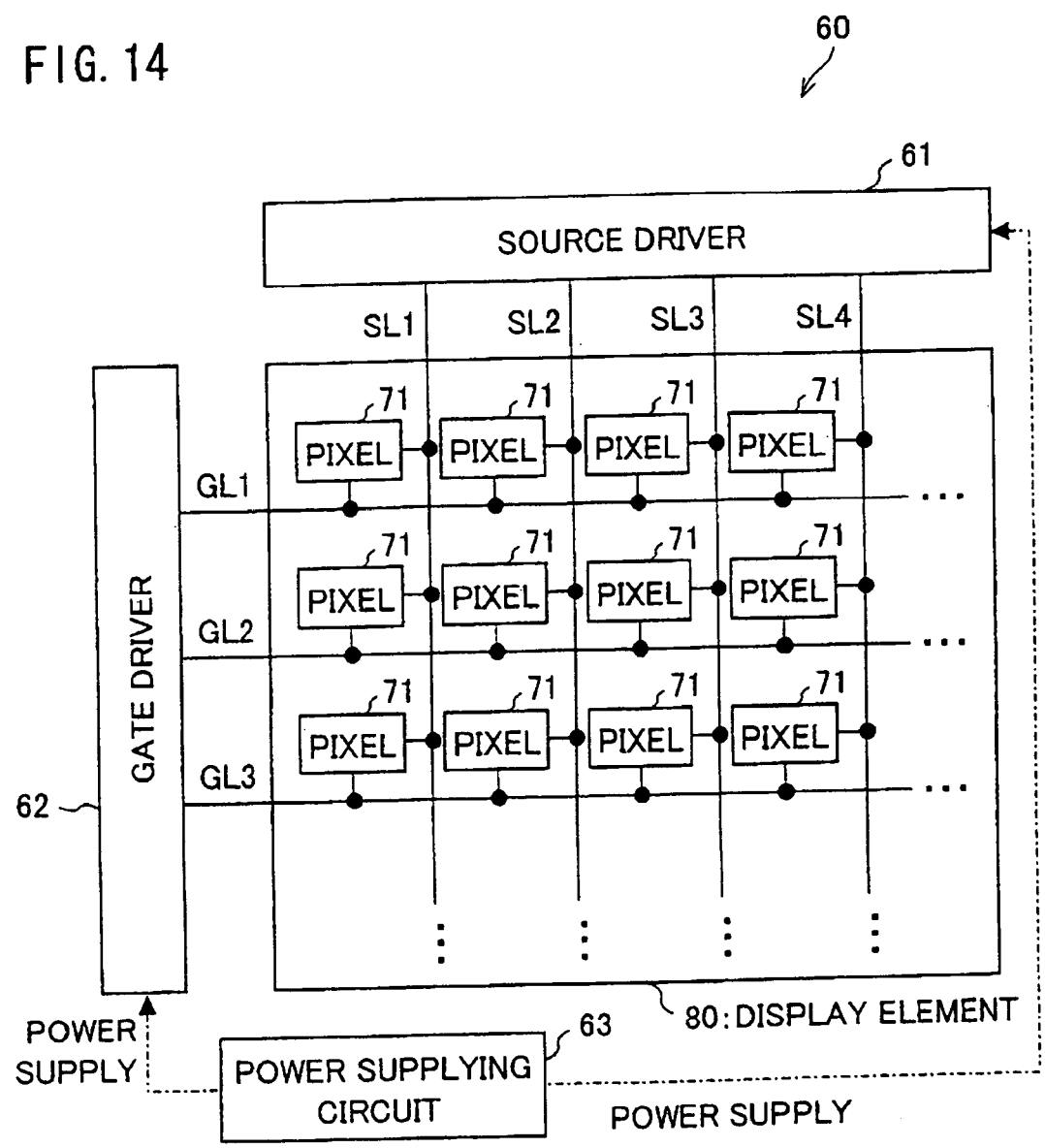
FIG. 14 is a block diagram illustrating a schematic arrangement of various parts of a display device using a display element in accordance with one embodiment of the present invention.
Figure 15:
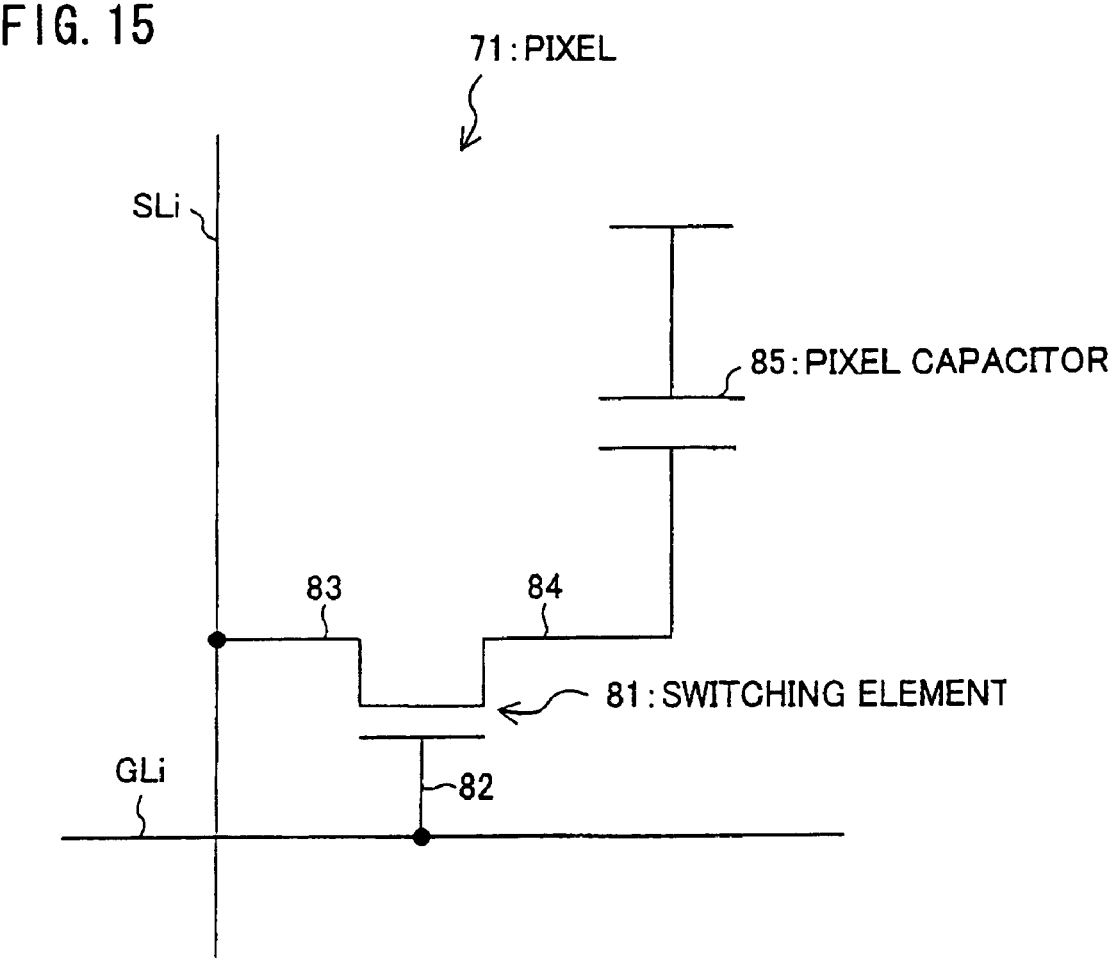
FIG. 15 is a schematic diagram illustrating a schematic arrangement of one pixel of the display element illustrated in FIG. 14.

FIG. 1 is a cross-sectional view illustrating a schematic arrangement of various parts of a display element in accordance with the example embodiment. FIG. 2 is a view for explaining a relationship between an electrode structure and polarizing plate absorption axes in the display element. FIG. 14 is a block diagram illustrating a schematic arrangement of various parts of a display device using the display element in accordance with the example embodiment. FIG. 15 is a schematic diagram illustrating a schematic arrangement of one pixel of the display element illustrated in FIG. 14.

The display element in accordance with the example embodiment is provided in the display device together with a drive circuit.

As illustrated in FIG. 14, the display device 60 in accordance with the example embodiment is provided, e.g. with a display element 80 in which pixels 71 are provided in the form of a matrix manner.

As illustrated in FIG. 15, each pixels 71 is provided with a display element 80 and a switching element 81 (will be described later).

Moreover, the display element 80 is provided with a plurality of data signal lines SL1 to SLv (v is an arbitral integer not less than 2), and a plurality of scanning signal lines GL1 to GLw (w is an arbitral integer not less than 2), which cross with the data signal lines SL1 to SLv. A pixel 71 are respectively provided at each intersection of one of the data signal lines SL1 to SLv and one of scanning signal lines GL1 to GLw.

The power source circuit 63 supplies a voltage to the source driver 61 and the gate driver 62 in order to cause the display panel 70 to perform display operation. By using the voltage, the source driver 61 drives (address) the data signal lines SL1 to SLv in the display element 80. Meanwhile, by using the voltage, the gate driver 62 drives (address) the scanning signal lines GL1 to GLw in the display element 80.

Each pixel 71 is provided with a switching element 81 and a pixel capacitor (load capacitor) 85.

The switching element 81 may be, for example, an FET (Field Effect Transistor), a TFT (Thin Film Transistor) or the like. The switching element 81 is connected to the scanning signal line GLw via its gate electrode 82, and to the data signal line SLv via its source electrode 83. Further, the switching element 81 is connected with a common electrode line (not illustrated) via its drain electrode 84. Each pixel 71 is commonly connected with the common electrode line. The pixel capacitor 85 is formed between the drain electrode 84 and the common electrode line. With this arrangement, the pixels 71 work as follows: the switching element 81 is turned ON in a pixel 71 when a scanning signal line GLu (u is an arbitral integer not less than 1) is selected. Then, a signal voltage determined in accordance with the display data signal inputted from a controller (display-use control section, display-use control device; not illustrated) is applied on the display element 80 via the data signal line SLu (u is an arbitral integer not less than 1) from the source driver 61. An electric charge corresponding to the voltage applied to the display element 80 is charged in the pixel capacitor 85. While the switching element is OFF after the period in which the scanning signal line GLu is selected is ended, the display element 80 ideally keeps holding the voltage that it has when the switching element 81 is turned OFF.

In the example embodiment, the display element 80 performs the display operation by using a medium which is optically isotropic in dependence upon application of an electric field (e.g., voltage), e.g., being isotropic either when the electric field is applied or is not applied. The term "medium" encompasses a liquid crystalline medium, a liquid crystal material, a liquid crystal mixture, and a dielectric material or layer, or any similar terms or derivations thereof, all such terms being used essentially interchangeably but more often simply referred to as "medium". In being "optically isotropic" is meant that the medium is at least macroscopically isotropic in the visible light wavelength region (i.e., in a scale equal to or larger than a wavelength scale of the visible light).

The following description explains one example of an arrangement of the display element 80 in accordance with the example embodiment in reference to FIGS. 1 and 2.

As illustrated in FIG. 1, the display element 80 of the example embodiment is structured such that (i) a pair of substrates (hereinafter referred to as pixel substrate 11 and counter substrate 12) are provided face to face as means for holding a medium (e.g. optical modulation layer holding means), at least one of which is transparent, and (ii) a cell 91 in which, between these substrates, a medium layer 3 is provided as an optical modulation layer, the medium layer 3 being made of a medium (hereinafter referred to as medium A) which is optically modulated by application of an electric field. In addition, polarizing plates (polarizers) 6 and 7 are respectively provided on outer surfaces of the cell 91, i.e., on outer surfaces of the substrate. In other words, the polarizing plates 6 and 7 are respectively provided on that surfaces of the pixel substrate 11 and the counter substrate 12 which are opposite to facing surfaces thereof which face each other.

As illustrated in FIG. 1, the pixel substrate 11 includes a transparent substrate 1, and the counter substrate 12 includes a transparent substrate 2. The transparent substrate 1 may be a glass substrate, for example. Moreover, interleave electrodes 4 and 5 (first and second electrodes), which have comb-like shapes, are provided on a surface of the substrate 1 of the pixel substrate 11, the surface facing the substrate 2, that is, the surface facing the counter substrate 12. The interleave electrodes 4 and 5 (first and second electrodes (electrode pair)) are means for applying, to the medium layer 3, an electric field (i.e. horizontal electric field) substantially parallel to the substrate 1 (i.e. the interleave electrodes 4 and 5 are members for applying the electric field). As illustrated in FIG. 2, comb-teeth portions 4a and 5a of the interleave electrodes 4 and 5 are arranged face to face so that the comb-teeth portions 4a and 5a interleave with each other (i.e. the interleave electrodes (i.e. the first and second electrodes (electrode pair) interleave with each other).

On the other hand, the counter substrate 12 is, as illustrated in FIG. 1, provided with a transparent substrate, which may be, for instance, a glass substrate or the like. On that facing surface of the substrate 2 which faces against the pixel substrate 11, an electrode 21 is provided as a third electrode in addition to the first and the second electrodes. The electrode 21, for example, functions as a shielding electrode, which shields the display element 80 from the static electricity.

The interleave electrodes 4 and 5 and the electrode 21 are made of electrode materials such as transparent electrode materials (for example, ITO (indium tin oxide), etc.). In the example embodiment, the interleave electrodes 4 and 5 have a line width of 5 μm, and the distance between the electrodes (electrode interval) is 5 μm, and the thickness of the electrode is 0.3 μm. The above-mentioned electrode material, the line width, the distance between the electrodes, and the thickness of the electrode are just one example, and are not limited to this.

The cell 91 of the display element 80 is formed such that (i) the pixel substrate 11 and the counter substrate 12 are made to adhere to each other by a sealing agent (not illustrated), if necessary, with a spacer (not illustrated) interposed therebetween (such as plastic beads, glass fiber spacer, or the like), and (ii) the medium A is injected and sealed in an air gap between the substrates.

The medium A used in the example embodiment changes the magnitude of its optical anisotropy by application of the electric field. When an electric field $E_j$ is applied from outside to a material, an electric displacement $D_{ij} = \in_{ij} \cdot E_j$ is generated, and a dielectric constant ($\in_{ij}$) also changes a little. In frequency of light, a refractive index (n) multiplied by itself is equivalent to the dielectric constant. Therefore, the medium A may be a material which changes its refractive index by application of the electric field. It does not matter if the medium A is liquid, gas, or solid.

Thus, the display element 80 of the example embodiment carries out a display by using such a phenomenon that an electric field application changes the magnitude of the optical anisotropy of a material, for example, such a phenomenon (electro-optic effect) that a refractive index of a material is changed by an outer electric field. Unlike a conventional liquid crystal display element using such a phenomenon that molecules (alignment directions of molecules) lined up in a fixed direction rotate all together by application of the electric field, a direction of the optical anisotropy is almost unchanged, and the display is carried out by the change of the magnitude of the optical anisotropy (mainly, an electronic polarization and an alignment polarization).

As described above, in the conventional liquid crystal display element, the display operation is carried out by utilizing only the change in the orientational direction of the liquid crystal molecules due to rotation thereof caused by the electric field application. The liquid crystal molecules in alignment are rotated together in one direction. Thus, inherent viscosity of the liquid crystal largely affects response speed. On the other hand, the display element 80 of the example embodiment, in which the display is carried out by utilizing the change in the modulation of the optical anisotropy in the medium, is free from the problem that the inherent viscosity of the liquid crystal largely affects response speed, unlike the conventional liquid crystal display element. Thus, it is possible to realize high-speed response. Moreover, the high-speed response allows the display element 80 of the example embodiment to be used, for example, in a display device of the field sequential color mode.

Moreover, the conventional liquid crystal display element has a problem in that its driving temperature range is limited to temperatures near a phase transition point of a liquid crystal phase, and thus it requires a highly accurate temperature control. On the other hand, the display element 80 of the example embodiment is only required that the medium be kept at temperatures at which the magnitude of the optical anisotropy is changeable by the application of the electric field. Thus, it is possible to easily perform the temperature control in the preset invention.

Moreover, according to the display element 80 of the example embodiment, it is possible to realize a wider viewing angle property than in the conventional liquid crystal display element, because the present invention utilizes, for performing the display operation, the change in the magnitude of the optical anisotropy of the medium, whereas the conventional liquid crystal display element utilizes, for performing the display operation, the change in the orientational direction of the liquid crystal.

The medium A used in the example embodiment (i) may be a material which shows Pockel's effect or Kerr effect, that is, may be a material which is optically isotropic (isotropic in broad view) when no electric field is applied, and expresses the optical anisotropy when an electric field is applied, or (ii) may be a material which has the optical anisotropy when no electric field is applied, and loses the optical anisotropy and express the optical isotropy (isotropy in broad view) when an electric field is applied. Moreover, the medium A may be a material which shows the optical anisotropy when no electric field is applied and changes the magnitude of the optical anisotropy by applying an electric field. A typical example of the medium is optically isotropic (isotropic in broad view) when no electric field is applied, and expresses an optical modulation when an electric field is applied (it is especially preferable that a double refraction rise by application of an electric field).

Pockel's effect and Kerr effect (which can be seen in an isotropic phase state) are the electro-optic effects which are respectively in proportion to the electric field and the square of the electric field. When no electric field is applied, a material is in an isotropic phase so that the material is optically isotropic. When an electric field is applied, in a region where an electric field is applied, long-axis directions of compound molecules are aligned along an electric field direction so that the double refraction is expressed. Thus, it is possible to modulate transmittance. For example, in case of a display method using a material showing Kerr effect, deviation of electrons in a single molecule is controlled by application of the electric field, so that each of the molecules randomly arranged rotates in order to change its direction. Therefore, responsive speed is very quick. Moreover, because the molecules are arranged randomly, the display method using the material which shows Kerr effect has such an advantage that there is no limit in terms of a viewing angle. In the above medium A, materials which are roughly in proportion to the electric field or the square of the electric field can be treated as materials showing Pockel's effect or Kerr effect.

An example of the material showing Pockel's effect is an organic solid material (for example, hexamine), and the like, but it is not especially limited. Various organic and inorganic materials showing Pockel's effect can be used as the medium A.

Examples of the material showing Kerr effect are PLZT (metal oxide prepared by adding lanthanum to a solid solution of lead zirconate and lead titanate), liquid crystal materials shown by the following structural formulas (1) to (4), and the like. However, the examples are not particularly limited to them.

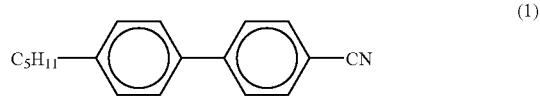

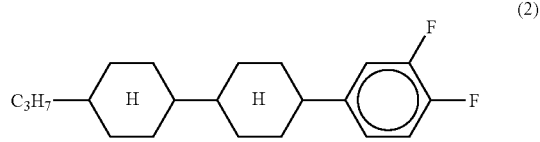

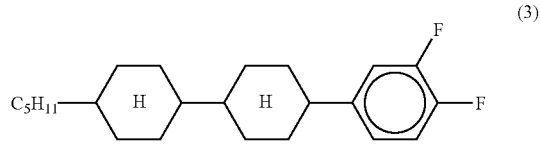

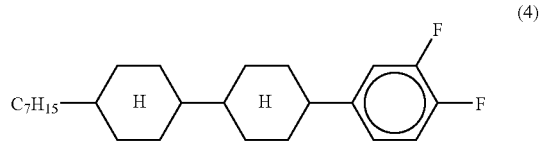

Kerr effect is observed in a medium which is transparent with respect to incident light. Therefore, the material showing Kerr effect is used as a transparent medium. Commonly, with an increase in temperature, the phase of the liquid crystal material transits from a liquid crystal phase having a short-distance order to the isotropic phase having molecules aligned randomly. In other words, Kerr effect of the liquid crystal material can be seen in a liquid not in a nematic phase but in the isotropic phase state at a liquid crystal phase/isotropic phase transition temperature or higher. The liquid crystal material is used as transparent dielectric liquid.

When an operating environmental temperature (heat temperature) is high by application of heat, the dielectric liquid such as the liquid crystal material is in the isotropic phase state. Therefore, when the dielectric liquid such as the liquid crystal material is used as the medium, in order to use the dielectric liquid which is in a liquid state and transparent, that is, transparent with respect to the visible light, for example, (1) it is possible to heat the dielectric liquid by heating means such as heater (not illustrated) provided around the medium layer 3, so that the temperature of the dielectric liquid reaches its clearing point or higher, or (2) it is possible to heat the dielectric liquid by heat radiation from a back light, heat conduction from the back light and/or peripheral driving circuits (in this case, the back light and the peripheral driving circuit function as heating means), or the like, so that the temperature of the dielectric liquid reaches its clearing point or higher, or (3) it is possible to heat the dielectric liquid by a sheet heater (heating means) attached as a heater on at least one of the substrates 1 and 2, so that the temperature of the dielectric liquid reaches a predetermined temperature. In addition, in order to use the dielectric liquid in a transparent state, it is possible to use a material having a clearing point which is lower than a lower limit of an operating temperature range of the display element 80.

It is preferable that the medium A include the liquid crystal material. When using the liquid crystal material as the medium A, it is preferable that, in broad view, the liquid crystal material be a transparent liquid in the isotropic phase, and, in narrow view, the liquid crystal material include a cluster which is an assembly of molecules arranged in a certain direction and having the short-distance order. The liquid crystal material is used in a transparent state with respect to the visible light, so that the cluster is also used in a transparent (optically isotropic) state with respect to the visible light.

On this account, as described above, the temperature of the display element 80 may be controlled by using heating means such as heater. As described in Publication of Japanese Patent Application, publication No. 11-183937 (Tokukaihei 11-183937; published on Jul. 9, 1999); corresponding to U.S. Pat. No. 6,266,109), a polymeric material which is divided into sub-regions, or the like may be used for the medium layer 3. Moreover, for example, a diameter of the liquid crystal material is set to be 0.1 μm or less. In other words, the liquid crystal material is made into minute droplets each having smaller diameter than the wavelength of visible light. In this way, scattering of light is suppressed and the liquid crystal material is in a transparent state. Furthermore, it is possible to use a liquid crystal compound which is transparent and is in the isotropic phase at operating environmental temperatures (room temperatures). It is possible to ignore the scattering of light when the diameter of the liquid crystal material is 0.1 μm or less, or when axis (major axis) of the cluster is 0.1 μm or less. In other words, It is possible to ignore the scattering of light when the diameter of the liquid crystal material and the axis (major axis) of the cluster are shorter than the wavelength of visible light (wavelength of incident light). On this account, when the axis of the cluster is 0.1 μm or less, the cluster is also transparent with respect to the visible light.

As described above, the medium A is not limited to materials showing Pockel's effect or Kerr effect. A molecular arrangement of the medium A may be (i) an orderly structure, having a cubic symmetry and a scale smaller than the wavelength of visible light (for example, nano-scale), and (ii) in a cubic phase which is optically isotropic (see "Kazuya Saito and another, "Thermodynamics of Optically-Isotropic Rare Thermotropic Liquid Crystal", EKISHO, 2001, Vol. 5, No. 1, p. 20-27" (hereinafter referred to as "Non-patent Document 3"), "Hirotsugu Kikuchi and four others, "Polymer-stabilized liquid crystal blue phases", p. 64-68, [online], Sep. 2, 2002, Nature Materials, Vol. 1, [searched on Jul. 10, 2003], Internet <URL: http://www.nature.com/naturematerials>" (hereinafter referred to as "Non-patent Document 6"), "Makoto Yoneya, "Nanostructure Liquid Crystal Phase Examined By Molecular Simulation", EKISHO, 2003, Vol. 7, No. 3, p. 238-245" (hereinafter referred to as "Non-patent Document 7"), "D. Demus and three others, "Handbook of Liquid Crystals Low Molecular Weight Liquid Crystal", Wiley-VCH, 1998, Vol. 2B, p. 887-900" (hereinafter referred to as "Non-patent Document 8"). The cubic phase is one of liquid crystal phases of the liquid crystal material which can be used as the medium A. An example of the liquid crystal material showing the cubic phase is BABH8 which is shown by the following structural formula (5):

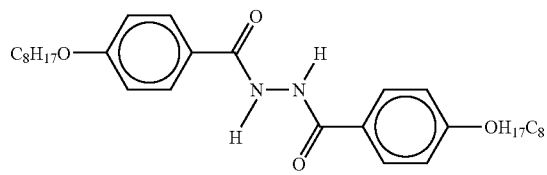

(5)

When an electric field is applied to the above liquid crystal material, its fine structure is distorted, so that it becomes possible to induce the optical modulation.

In a temperature range from 136.7° C. to 161° C., BABH8 is in the cubic phase of the orderly structure having the cubic symmetry and a scale smaller than the wavelength of visible light. The orderly structure (cubic symmetric orderly structure) of the cubic phase has a lattice constant about 6 nm, that is, smaller than the light wavelength by more than 1 digit. Thus, BABH8 has the orderly structure having a scale smaller than the wavelength of visible light, and shows the optical isotropy in the above-mentioned temperature range when no electric field is applied (isotropic in a broad view). Therefore, satisfactory black display can be carried out under crossed nicols.

Moreover, the temperature of BABH8 is controlled by the above-mentioned heating means to be from 136.7° C. to 161° C., and an electric field (voltage) is applied between the interleave electrodes 4 and 5. This causes a structure (orderly structure) having the cubic symmetry to be distorted. That is, in the above-mentioned temperature range, BABH8 is isotropic when no electric field is applied, and expresses the anisotropy when an electric field is applied.

Therefore, the double refraction is generated in the medium layer 3, so that the display element 80 can carry out a satisfactory white display. The double refraction is generated in a fixed direction, and its size changes according to electric field (voltage) application. A voltage transmittance curve shows a relationship between (i) a voltage applied between the interleave electrodes 4 and 5 and (ii) transmittance. The voltage transmittance curve draws a stable curve in a temperature range from 136.7° C. to 161° C., that is, in a wide temperature range (about 20K). On this account, when BABH8 is used as the medium A, it is extremely easy to control the temperature. That is, the medium layer 3 made of BABH8 is thermally in a stable phase, so that sudden temperature dependency does not occur, and it is extremely easy to control the temperature.

Moreover, as the medium A, it is possible to realize a system (i) which is filled with assemblies, in each of which the liquid crystal molecules are smaller than the wavelength of visible light and are aligned in a radial pattern, and (ii) which is optically isotropic. To realize this, it is possible to use a technique of liquid crystal microemulsion described in "Jun Yamamoto, "Liquid Crystal Microemulsion", EKISHO, 2000, Vol. 4, No. 3, p. 248-254" (hereinafter referred to as "Non-patent Document 4)", or a technique of a liquid crystal/fine particle dispersion system (mixture system in which fine particles are mixed in a solvent (liquid crystal), hereinafter referred to as liquid crystal fine particle dispersion system) described in "Yukihide Shiraishi and four others, "Palladium Nanoparticles Protected By Liquid Crystal Molecules— Preparation and Application to Guest-Host Mode Liquid Crystal Display Element", KOBUNSHI RONBUNSHU (Japanese Journal of Polymer Science and Technology), December 2002, Vol. 59, No. 12, p. 753-759" (hereinafter referred to as "Non-patent Document 5"). When an electric field is applied to them, the assemblies each having molecules aligned in a radial pattern are distorted, so that it is possible to induce the optical modulation.

Each of these liquid crystal materials may be (i) a compound (liquid crystalline simple substance) that solely shows the liquid crystalline property, (ii) a mixture that shows its liquid crystalline property when a plurality of substance are mixed together, (iii) a mixture of (a) such liquid crystalline simple substance or such liquid crystalline mixture, and (b) a non-liquid crystalline material. Moreover, it is possible to apply polymer/liquid crystal dispersion system materials described in Non-patent Document 1 (Shiro MATSUMOTO, and three others "Fine droplets of liquid crystals in a transparent polymer and their response to an electric field", Appl. Phys. Lett., 1996, Vol. 69, p. 1044-1046). Furthermore, it is possible to add a gelling agent described in "Takashi KATO and two others, "Fast and High-Contrast Electro-optical Switching of Liquid-Crystalline Physical Gels: Formation of Oriented Microphase-Separated Structures", Adv. Funct. Mater., April 2003, Vol. 13. No. 4, p. 313-317" (hereinafter referred to as "Non-patent Document 2").

It is preferable that the medium A contains polar molecules. For example, nitrobenzene is preferable as the medium A. Nitrobenzene is one of the mediums showing Kerr effect.

The following description shows materials which can be used as the medium A, and forms of the materials. However, the present invention is not limited to the following description.

[Smectic D phase (SmD)]

Smectic D phase (SmD) is one of liquid crystal phases of liquid crystal materials which can be used as the medium A. The smectic D phase (SmD) has a three-dimensional grating structure, and its grating constant is smaller than the wavelength of visible light. Therefore, the smectic D phase is optically isotropic.

An example of a liquid crystal material showing the smectic D phase is ANBC16 represented by the following general formulas (6) and (7) described in Non-patent Documents 3 or 8:

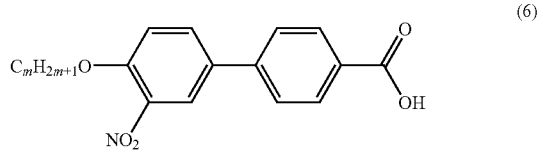

(6)

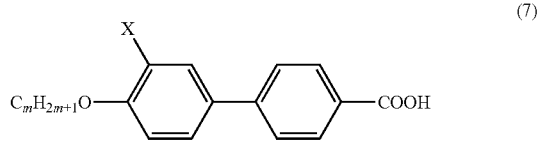

(7)

In the above general formulas (6) and (7), m is an arbitrary integer. To be more precise, m=16 in the general formula (6), and m=15 and X is —NO2 group in the general formula (7).

ANBC16 expresses the smectic D phase in a temperature range from 171.0° C. to 197.2° C. In the smectic D phase, a plurality of molecules form a 3-dimensional lattice like a jungle gym (Registered Trademark). The lattice has a lattice constant of several ten nm or less, which is less than the wavelength of visible light. That is, the smectic D phase has a cubic symmetry and orderly orientation (orderly structure) smaller than the wavelength of visible light. The lattice constant of ANBC16 described in the example embodiment is about 6 nm. Because of this, the smectic D phase is optically isotropic. However, when an electric field is applied to ANBC16 in the above temperature range in which ANBC16 shows the smectic D phase, molecules of ANBC16 tend to change their directions to the direction of the electric field because the molecules have dielectric anisotropy. As a result, the grating structure is distorted. That is, ANBC16 expresses the optical anisotropy. Note that, not only ANBC16 but also materials showing the smectic D phase are applicable as the medium A of the display element 80 of the example embodiment, because the magnitude of the optical anisotropy is changeable according to whether or not the electric field is applied (that is, between when the electric field is applied and when no electric field is applied).

[Liquid Crystal Microemulsion]

As proposed in Non-patent Document 4, liquid crystal microemulsion is a generic term for a system (mixture system) in which oil molecules of O/W type microemulsion (a system in which droplet-shape water is dissolved in oil (continuous phase) by surfactant) are replaced with thermotropic liquid crystal molecules.

A concrete example of the liquid crystal microemulsion is a mixture system of pentyl-cyano-biphenyl (5CB) and didodecyl-ammonium-bromide (DDAB) solution. Pentyl-cyano-biphenyl (5CB) is a thermotropic liquid crystal showing a nematic liquid crystal phase, and didodecyl-ammonium-bromide (DDAB) is a lyotropic liquid crystal showing a reverse micelle phase. This mixture system has a structure illustrated by schematic views of FIGS. 8 and 9.

According to the above mixture system, a diameter of a reverse micelle is about 50 Å, and a distance between reverse micelles is about 200 Å. Each of these scales is approximately one tenth of the light wavelength. That is, the above-described mixture system has an orientational order (orderly structure) smaller than the wavelength of visible light. The reverse micelles randomly exist in a three-dimensional space, and 5CBs are aligned in a radial pattern centering on each reverse micelle. Therefore, the above mixture system is optically isotropic.

When an electric field is applied to a medium made of the above mixture system, molecules tend to change their directions to the direction of the electric field because 5CB has dielectric anisotropy. That is, although a system is optically isotropic because 5CBs are aligned in a radial pattern centering on the reverse micelle, alignment anisotropy is expressed, and the optical anisotropy is expressed. The medium A is not limited to the above mixture system. In cases where the liquid crystal microemulsion is optically isotropic when no electric field is applied, and is optically anisotropic when an electric field is applied, it is possible to apply the liquid crystal microemulsion as the medium A of the display element 80 of the example embodiment.

[Lyotropic Liquid Crystal]

The lyotropic liquid crystal is a multicomponent system liquid crystal in which molecules constituting a liquid crystal are dissolved in a solvent (water, organic solvent, or the like) having different properties. In the example embodiment, lyotropic liquid crystal having particular phases can be used as the lyotropic liquid crystal. The particular phases are phases whose optical anisotropy is changeable in magnitude depending on whether or not the electric field is applied (that is, between when the electric field is applied and when no electric field is applied). An example of the particular phases is a phase that is optically isotropic when no electric field is applied but becomes optically anisotropic when the electric field is applied. Examples of such particular phases are micelle phase, sponge phase, cubic phase, and reverse micelle phase, which are described in "Jun Yamamoto, "Liquid Crystal Scientific Experiment Course 1: Identification of Liquid Crystal Phase: (4) Lyotropic Liquid Crystal", EKISHO, 2002, Vol. 6, No. 1, p. 72-83" (hereinafter referred to as "Non-patent Document 11"). FIG. 10 illustrates a classification view of lyotropic liquid crystal phases.

Some of surfactants, which are amphiphilic materials, express the micelle phase. For example, an aqueous solution of sodium dodecyl sulfate and an aqueous solution of potassium palmitin acid, both of which are ionic surfactants, form spherical micelles. In mixture liquid which is a non-ionic surfactant and is a mixture of polyoxyethylene nonylphenyl ether and water, a nonylphenyl group functions as hydrophobic group and oxyethylene chain functions as hydrophilic group, so that micelles are formed. An aqueous solution of styrene-ethyleneoxideblock copolymer also forms micelles For example, the spherical micelle becomes globular by packing molecules in all spatial directions (by forming a molecular group). The size of the spherical micelle is smaller than the wavelength of visible light, so that the spherical micelle is not anisotropic but isotropic. That is, the spherical micelle has an orderly structure (orientational order) smaller than the wavelength of visible light. However, when an electric field is applied to such spherical micelle, the spherical micelle is distorted, so that the optical anisotropy is expressed. Therefore, it is possible to apply the lyotropic liquid crystal in the spherical micelle phase as the medium A of the display element 80 of the example embodiment. Note that, not only the lyotropic liquid crystal in the spherical micelle phase but also the lyotropic liquid crystal in other types of micelle phases such as string-type micelle phase, ellipse-type micelle phase, stick-type micelle phase can be used as the medium A in order to obtain the same effects.

Moreover, it is well-known that the reverse micelle in which the hydrophilic group and the hydrophobic group are replaced with each other is formed depending on conditions of concentration, temperature, and surfactant. Such reverse micelle optically shows the same effects as the micelle does. Therefore, when the lyotropic liquid crystal in the reverse micelle phase is applied as the medium A, it is possible to obtain effects equivalent to effects obtained in cases where the lyotropic liquid crystal in the micelle phase is used. The above-mentioned liquid crystal microemulsion is one example of the lyotropic liquid crystal in the reverse micelle phase (reverse micelle structure).

Moreover, an aqueous solution of pentaethyleneglycol-dodecylether, which is a non-ionic surfactant, shows the sponge phase or the cubic phase as illustrated in FIG. 10, depending on its concentration and temperature. Each of such sponge phase and cubic phase has an assembly of orderly aligned molecules which has a diameter (orientational order, orderly structure) smaller than the wavelength of visible light, so that the materials are transparent. That is, the medium having these phases is optically isotropic. When an electric field (voltage) is applied to the medium having these phases, the orientational order (orderly structure) is changed and the optical anisotropy is expressed. Therefore, the lyotropic liquid crystal having the sponge phase or the cubic phase can be applied as the medium A of the display element 80 of the example embodiment.

[Liquid Crystal Fine Particle Dispersion System]

For example, the medium A may be a liquid crystal fine particle dispersion system in which an aqueous solution of pentaethyleneglycol-dodecylether, which is a non-ionic surfactant, is mixed with latex particles whose surfaces are modified by using a sulfuric acid group and each of which has a diameter of about 100 Å. The liquid crystal fine particle dispersion system expresses the sponge phase. The medium A used in the example embodiment may be a liquid crystal fine particle dispersion system expressing the micelle phase, the cubic phase, the reverse micelle phase, or the like, that is, the liquid crystal fine particle dispersion system showing a phase whose magnitude of the optical anisotropy changes depending on whether or not an electric field is applied. Note that, instead of using the latex particles, DDAB can be used to obtain the same alignment structure as the structure of the above-mentioned liquid crystal microemulsion.

[Dendrimer]

A dendrimer is a three-dimensional highly-branched polymer which branches per monomer unit. The dendrimer branches a lot. Therefore, when the molecular weight exceeds a certain level, the dendrimer constitutes a globular structure. The globular structure has an assembly of orderly aligned molecules which has a diameter (orderly structure, orientational order) smaller than the wavelength of visible light, so that the dendrimer is transparent. When an electric field is applied, the orientational order is changed and the optical anisotropy is expressed (the magnitude of the optical anisotropy changes). Therefore, it is possible to apply the dendrimer as the medium A of the display element 80 of the example embodiment. Moreover, in the above-mentioned liquid crystal microemulsion, instead of using DDAB, the dendrimer can be used to obtain the same alignment structure as the structure of the above-mentioned liquid crystal microemulsion. It is possible to apply thus-obtained medium as the medium A.

[Cholesteric Blue Phase]

As for the cholesteric blue phase, it is well-known that a screw axis constitutes a three-dimensionally periodic structure, and the structure is highly symmetric (for example, see Non-patent Documents 6 and 7). The cholesteric blue phase has an assembly of orderly aligned molecules which has a diameter (orderly structure, orientational order) smaller than the wavelength of visible light, so that the material is almost transparent. When an electric field is applied, the magnitudedegree of the orientational order is changed and the optical anisotropy is expressed. That is, the cholesteric blue phase is optically almost isotropic. When an electric field is applied to the cholesteric blue phase, its liquid crystal molecules tend to change their directions to the direction of the electric field, so that the grating is distorted and the optical anisotropy is expressed (the magnitude of the optical anisotropy changes).

A well-known material which shows the cholesteric blue phase is a composition which is formed by mixing 48.2 mol % of "JC1041" (which is a mixture liquid crystal produced by CHISSO), 47.4 mol % of "5CB" (4-cyano-4'-pentylbiphenyl, nematic liquid crystal), and 4.4 mol % of "ZLI-4572" (which is a chiral dopant produced by MERCK). The composition shows the cholesteric blue phase in a temperature range from 330.7K to 331.8K.

[Smectic Blue Phase]

Just like the cholesteric blue phase, the smectic blue phase (BPsm) has a highly-symmetric structure (for example, see Non-patent Document 7 and "Eric Grelet and three others, "Structural Investigations on Smectic Blue Phases", PHYSICAL REVIEW LETTERS, The American Physical Society, Apr. 23, 2001, Vol. 86, No. 17, p. 3791-3794" (hereinafter referred to as "Non-patent Document 10")). Moreover, the smectic blue phase (BPsm) has an assembly of orderly aligned molecules which has a diameter (orderly structure, orientational order) smaller than the wavelength of visible light, so that the material is almost transparent. When an electric field is applied, the degree magnitude of the orientational order is changed and the optical anisotropy is expressed (the magnitude of the optical anisotropy changes). That is, the smectic blue phase is optically almost isotropic. When an electric field is applied to the smectic blue phase, liquid crystal molecules tend to change their directions to the direction of the electric field, so that the grating is distorted and the optical anisotropy is expressed.

Note that, an example of materials showing the smectic blue phase is FH/FH/HH-14BTMHC described in Non-patent Document 10. The material shows a BPsm 3 phase in a temperature range from 74.4° C. to 73.2° C., a BPsm 2 phase in a temperature range from 73.2° C. to 72.3° C., a BPsm 1 phase in a temperature range from 72.3° C. to 72.1° C. As described in Non-patent Document 7, the BPsm phase has a highly-symmetric structure, so that the BPsm phase is optically almost isotropic. When an electric field is applied to FH/FH/HH-14BTMHC, liquid crystal molecules tend to change their directions to the direction of the electric field, so that the grating is distorted and the optical anisotropy is expressed. Therefore, it is possible to use FH/FH/HH-14BT-MHC as the medium A of the display element 80 of the example embodiment.

As described above, as long as the optical anisotropy (refractive index, orientational order parameter) of a material is changed by applying an electric field, the material used as the medium A of the display element 80 of the example embodiment may be (i) a material which shows Pockel's effect or Kerr effect, (ii) a material made of molecules in the cubic phase, the smectic phase, cholesteric blue phase, or the smectic blue phase, (iii) the lyotropic liquid crystal in the micelle phase, the reverse micelle phase, the sponge phase, or the cubic phase, or (iv) the liquid crystal fine particle dispersion system in the micelle phase, the reverse micelle phase, the sponge phase, or the cubic phase. In addition, the medium A may be the liquid crystal microemulsion, the dendrimer (dendrimer molecule), amphiphilic molecule, copolymer, or other polar molecules than those above.

Moreover, the medium A is not limited to the liquid crystal material, and it is preferable that the medium have the orderly structure (orientational order) which is smaller than the wavelength of visible light when an electric field is applied or when no electric field is applied. When the orderly structure is smaller than the wavelength of visible light, the medium A is optically isotropic. Therefore, by using the medium in which an assembly of orderly aligned molecules (orientational order) has a diameter smaller than the wavelength of visible light when an electric field is applied or when no electric field is applied, a display state when an electric field is applied and a display state when no electric field is applied are different.

In the following example embodiment, pentyl-cyano-biphenyl (5CB) shown by the structural formula (1) is used as the medium A, but the medium A is not limited to this. Instead of 5CB, it is possible to apply various materials described above.

According to the example embodiment, ITO is used as the interleave electrodes 4 and 5 which have a line width of 5 μm, and the distance between which is 5 μm. The thickness of the medium layer 3 (that is, a distance between the substrates 1 and 2) is 10 μm. 5CB is used as the medium A. 5CB is heated by the outer heating means (heating means) so as to keep the temperature which is just above a nematic phase/isotropic phase transition temperature. For example, the display element can be kept at a temperature slightly above the phase transition temperature $T_{ni}$, for example at $T_{ni}$+0.1 K. The transmittance can be changed by and according to electric field (voltage) application. 5CB is in the nematic phase at a temperature below 33.3° C., and in the isotropic phase at a temperature of 33.3° C. or higher.

In the example embodiment, as required, a dielectric thin film (alignment film, not illustrated) to which a rubbing treatment is carried out may be formed onto each of counter surfaces of the substrates 1 and 2. By forming the dielectric thin film on an inner side of at least one of the substrates 1 and 2, it is possible to improve the orientational order (orderly structure, orientational order) parameter, and possible to obtain better electro-optic effect such as Kerr effect.

The dielectric thin film may be an organic film or an inorganic film. Moreover, the dielectric thin film is not especially limited as long as the above-mentioned alignment effect can be obtained. However, when the dielectric thin film is constituted of the organic thin film, a satisfactory alignment effect can be obtained. Therefore, it is preferable that the organic thin film be used for the dielectric thin film. In the organic thin film, polyimide has high stability and high reliability, and shows extremely excellent alignment effect. Therefore, by using polyimide as the dielectric thin film material, it is possible to provide the display element 80 having satisfactory display performance.

The dielectric thin film may be formed on the inner side of at least one of the substrates 1 and 2, for example, formed on the substrate 1 such that the dielectric thin film covers the interleave electrodes 4 and 5. A thickness of the dielectric thin film is not especially limited. Moreover, the rubbing treatment is carried out with respect to the dielectric thin film formed on the substrate 1 and with respect to the dielectric thin film formed on the substrate 2, for example, in a reverse direction along the comb-teeth portions 4a and 5a of the interleave electrodes 4 and 5.

The following description explains a display principle of the display element 80 in accordance with the example embodiment in reference to FIGS. 3(a) and 3(b), and 6(a) to 6(h) and 16.

Note that, in FIGS. 6(a) to 6(h), the following description explains a display principle common to the display elements, which carry out the display by utilizing a change in an optical anisotropy caused by applying an electric field, in reference to a cross-sectional view of the various parts of the simplest display element H as the display element 80 of the example embodiment. The display element 80 of the example embodiment is structured such that the interleave electrodes 4 and 5 are formed on the substrate 1 of a pair of the substrates 1 and 2. Therefore, the interleave electrodes 4 and 5 can apply an electric field (horizontal electric field) substantially parallel to the substrate 1 to the medium layer 3. Note that, in the following description, a transmission-type display element is used as the display element 80 in accordance with the example embodiment and as the display element H, and the material used herein is optically almost isotropic, preferably isotropic when no electric field is applied, and is optically anisotropic when an electric field is applied. However, the present invention is not limited to this.

Figure 3A:
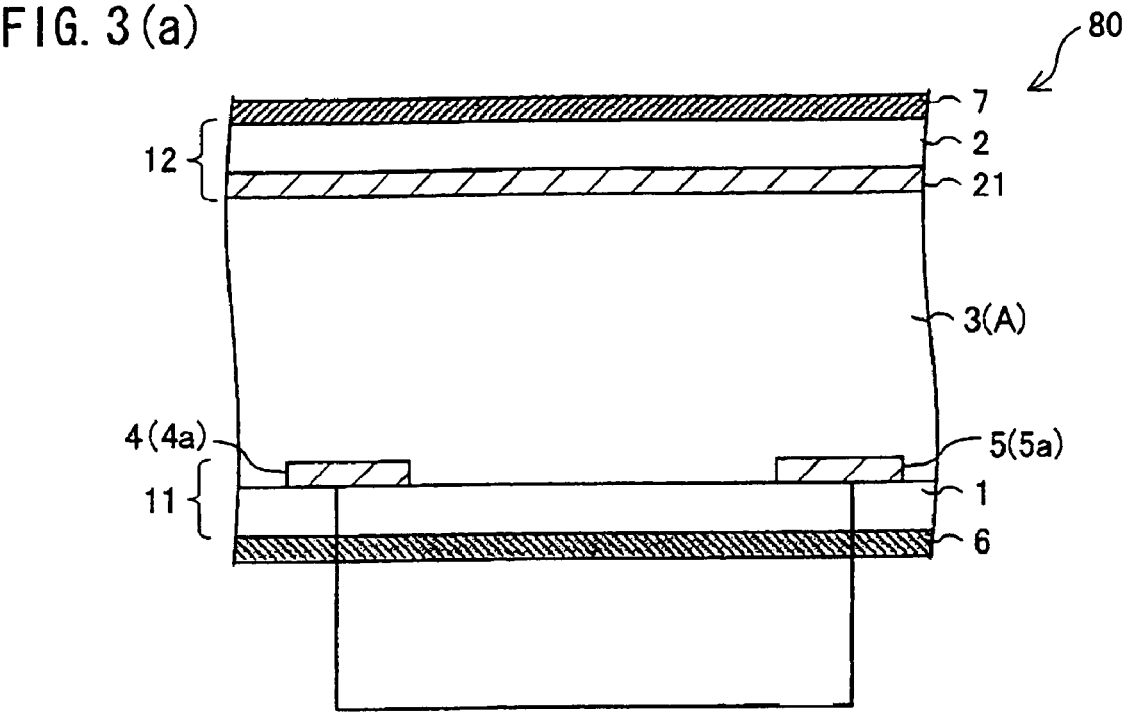
FIG. 3(a) is a cross-sectional view illustrating a schematic arrangement of various parts of a display element according to the example embodiment, to which no voltage is applied.
Figure 3B:
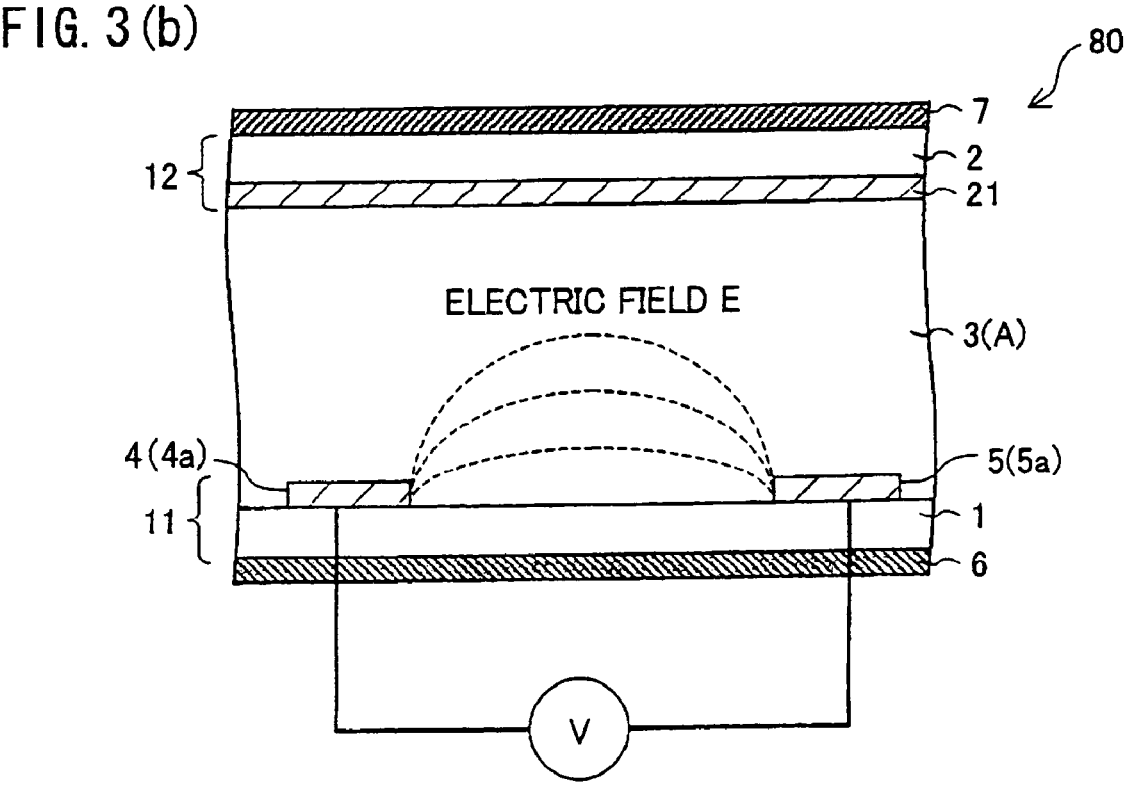
FIG. 3(b) is a cross-sectional view illustrating a schematic arrangement of various parts of the display element illustrated in FIG. 3(a) to which a voltage is applied.
Figure 4A:
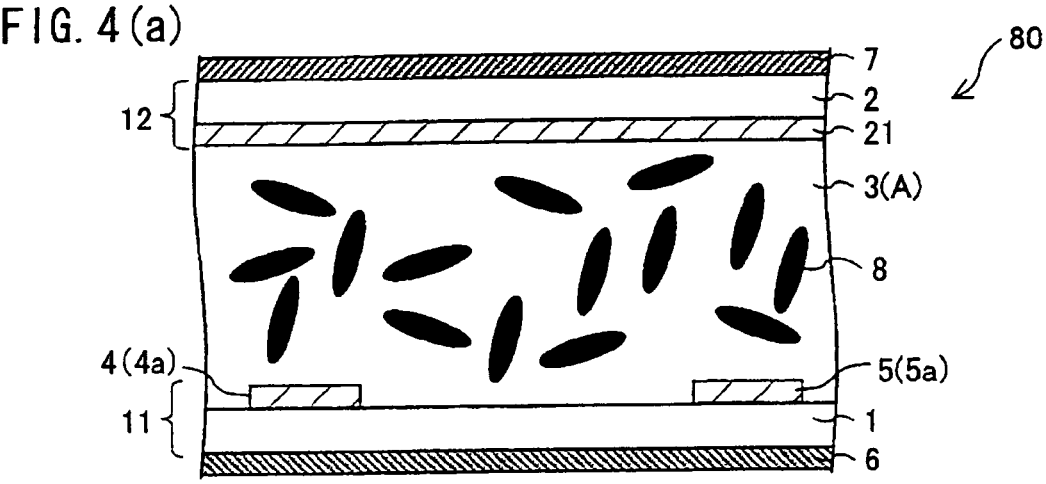
FIG. 4(a) is a cross-sectional view schematically illustrating a medium in the display element according to the example embodiment to which no voltage is applied (OFF state).
Figure 4B:
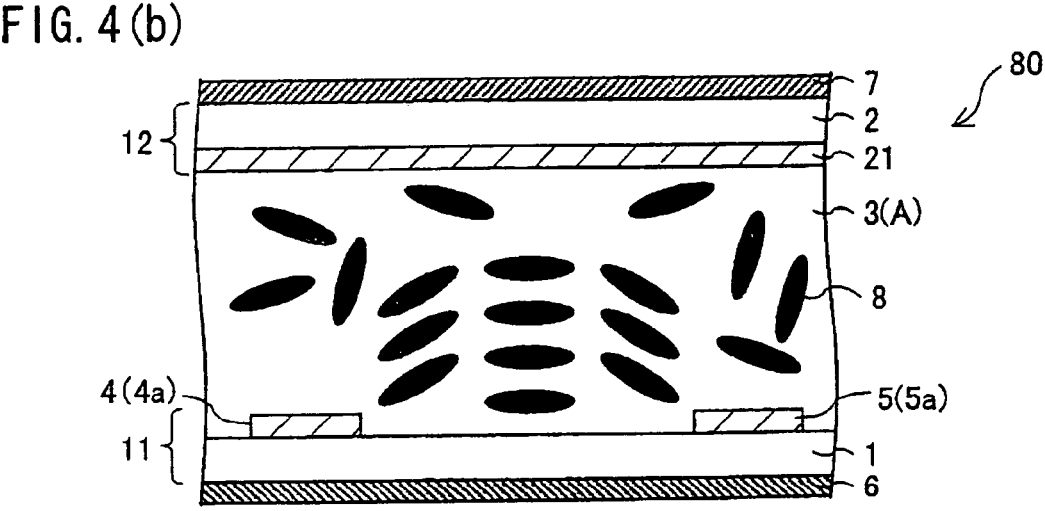
FIG. 4(b) is a cross-sectional view schematically illustrating a medium in the display element illustrated in FIGS. 3(a) and 3(b) to which a voltage is applied (ON state).
Figure 5:
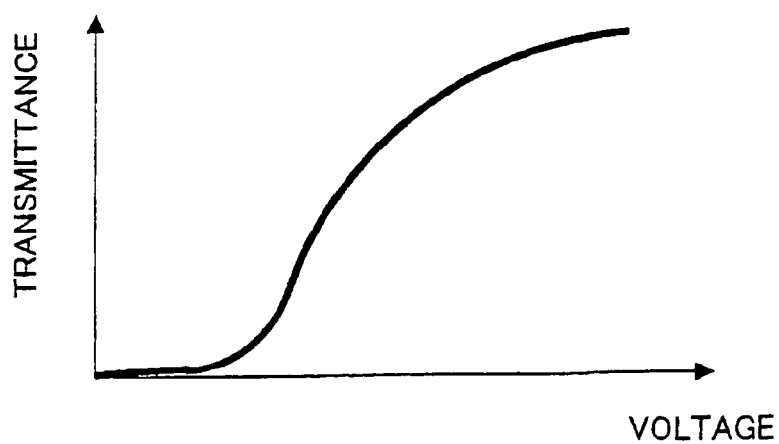
FIG. 5 is a graph showing a relationship between an applied voltage and transmittance in the display element illustrated in FIGS. 3(*a*) and 3(*b*).
Figure 6A:
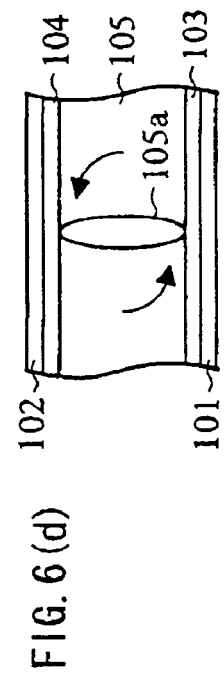
FIG. 6(*a*) is a cross-sectional view schematically illustrating a shape and a main axis direction of a typical refractive index ellipsoid of a medium in a display element when no electric field is applied to the medium. The display element carries out the display by utilizing a change in an optical anisotropy caused by application of an electric field.
Figure 6B:
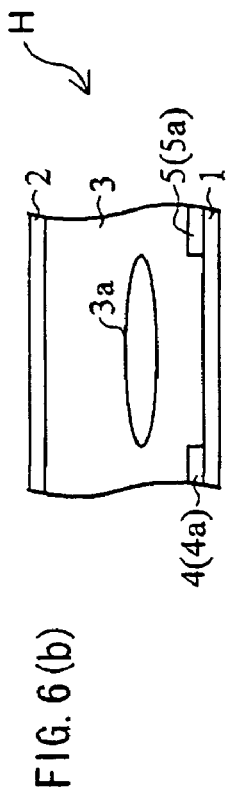
Figure 6C:
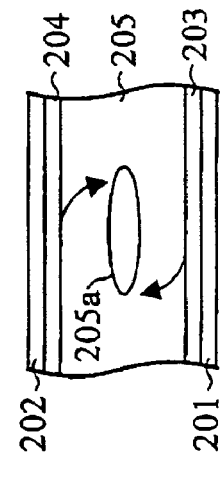
Figure 6D:
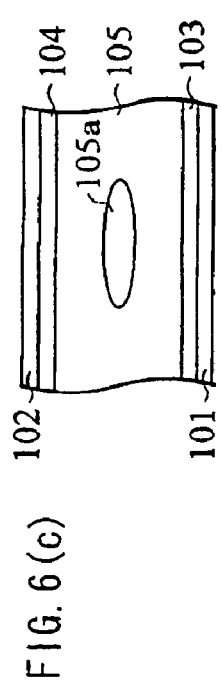
Figure 6E:
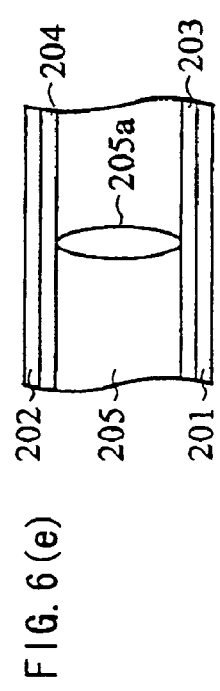
Figure 6F:
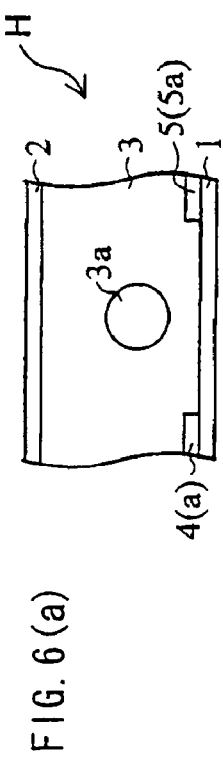
Figure 6G:
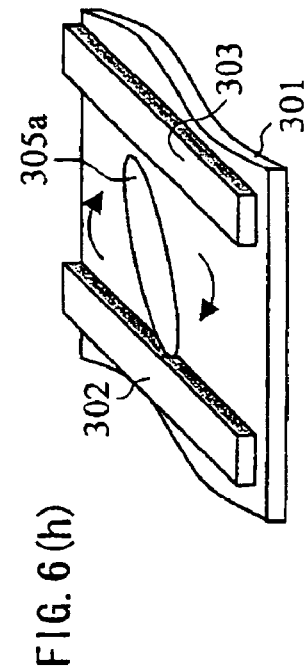
Figure 6H:
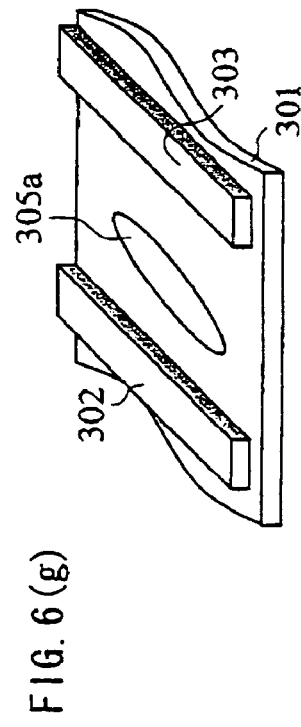

FIG. 3(a) is a cross-sectional view illustrating a schematic arrangement of various parts of a display element 80 according to the example embodiment to which no electric field (voltage) is applied (OFF state). FIG. 3(b) is a cross-sectional view illustrating a schematic arrangement of various parts of the display element 80 shown in FIG. 3(a) to which an electric field (voltage) is applied (ON state). FIG. 4(a) is a cross-sectional view schematically illustrating a medium in the display element 80 shown in FIGS. 3(a) and 3(b) to which no electric field (voltage) is applied (OFF state). FIG. 4(b) is a cross-sectional view schematically illustrating the medium in the display element 80 shown in FIGS. 3(a) and 3(b) to which an electric field (voltage) is applied (ON state). FIG. 5 is a graph showing a relationship between an applied voltage and transmittance in the display element of FIGS. 3(a) and 3(b). FIGS. 6(a) to 6(h) are cross-sectional views schematically illustrating differences of the display principle between the display element (display element H) which carries out the display by utilizing a change in an optical anisotropy caused by applying an electric field and the conventional liquid crystal display element. The differences are shown by average shapes of refractive index ellipsoids of the medium (i.e.

shapes of cut surfaces of refractive index ellipsoids) and their main axis directions, when no electric field (voltage) is applied (OFF state) and when an electric field (voltage) is applied (ON state). That is, FIG. 6(a) is a cross-sectional view illustrating the display element which carries out the display by utilizing a change in an optical anisotropy caused by applying an electric field, when no electric field is applied (OFF state). FIG. 6(b) is a cross-sectional view illustrating the display element when an electric field is applied (ON state). FIG. 6(c) is a cross-sectional view illustrating a conventional TN (Twisted Nematic) mode liquid crystal display element when no electric field is applied. FIG. 6(d) is a cross-sectional view illustrating the conventional TN mode liquid crystal display element when an electric field is applied. FIG. 6(e) is a cross-sectional view illustrating a conventional VA (Vertical Alignment) mode liquid crystal display element when no electric field is applied. FIG. 6(f) is a cross-sectional view illustrating the conventional VA mode liquid crystal display element when a voltage is applied. FIG. 6(g) is a cross-sectional view illustrating a conventional IPS (In Plane Switching) mode liquid crystal display element when no electric field is applied. FIG. 6(h) is a cross-sectional view illustrating the conventional IPS mode liquid crystal display element when an electric field is applied.

Generally, the refractive index of a material is not isotropic but varies according to its directions. Here, in cases where an x direction is a direction parallel to a substrate surface (in-plane direction of the substrate, substrate in-plane direction) and a direction opposite to the interleave electrodes 4 and 5, and a y direction is a direction parallel to the substrate surface (in-plane direction of the substrate, substrate in-plane direction) and a direction perpendicular to the direction opposite to the interleave electrodes 4 and 5, and a z direction is a direction perpendicular to the substrate surface (normal direction of the substrate, substrate normal direction), the anisotropy (optical anisotropy) of the refractive index is shown by an ellipsoid (refractive index ellipsoid) shown by the following equation (1) using an arbitrary orthogonal coordinate system ($X_1$, $X_2$, $X_3$) (for example, see "Ryouichi Yamamoto and another, "Organic Electro-Optic Materials", National Technical Report, December 1976, Vol. 22, No. 6, p. 826-834" (hereinafter referred to as "Non-patent Document 12"):

$$\sum_{ij} \left(\frac{1}{n_{ij}^2}\right) X_i X_j = 1 \quad (1)$$

(nji=nij, i, j=1, 2, 3).

When the equation (1) is rewritten by using a coordinate system (Y1, Y2, Y3) of the main axis direction of the ellipsoid, the following relational equation (2) is obtained:

$$\frac{Y_1^2}{n_1^2} + \frac{Y_2^2}{n_2^2} + \frac{Y_3^2}{n_3^2} = 1 \quad (2)$$

n1, n2, and n3 (hereinafter referred to as nx, ny, and nz) are called main refractive indices, and correspond to half in length of three main axes in the ellipsoid. In case of a light wave proceeding from an origin to a direction perpendicular to a surface of Y3=0, the light wave has polarization components in Y1 direction and Y2 direction. The refractive indices of the components in Y1 direction and Y2 direction are respectively nx and ny. Generally, a light proceeding in an arbitrary direction goes through the origin, and a surface perpendicular to a direction in which the light wave proceeds is a cut surface of the refractive index ellipsoid. Directions of main axes of this ellipse are polarization component directions of the light wave. Half in length of the main axis corresponds to the refractive index.

The following description explains the differences of the display principle between the display element which carries out the display by utilizing a change in an optical anisotropy caused by applying an electric field and the conventional liquid crystal display element. The display element H is used as an example of the display element which carries out the display by utilizing a change in an optical anisotropy which is caused by applying an electric field. TN mode, VA mode, and IPS mode are used as examples of the modes of the conventional liquid crystal display element.

As illustrated in FIGS. 6(c) and 6(d), the conventional TN mode liquid crystal display element is structured such that a liquid crystal layer 105 is sandwiched between a pair of substrates 101 and 102 which are provided face to face, and transparent electrodes 103 and 104 (electrode) are respectively provided on the substrates 101 and 102. When no electric field is applied, liquid crystal molecules of the liquid crystal layer 105 are aligned such that the liquid crystal molecules are spirally twisted in a long-axis direction. When an electric field is applied, the liquid crystal molecules are aligned such that the long-axis direction of each of the liquid crystal molecules is along an electric field direction. As illustrated in FIG. 6(c), a typical refractive index ellipsoid 105a is such that its main axis direction (long-axis direction) is parallel to the substrate surface (substrate in-plane direction) when no electric field is applied. As illustrated in FIG. 6(d), the typical refractive index ellipsoid 105a is such that its main axis direction turns to the substrate normal direction when an electric field is applied. That is, the shape of the refractive index ellipsoid 105a is an ellipse when no electric field is applied and when an electric field is applied. The long-axis direction (main axis direction, direction of the refractive index ellipsoid 105a) changes depending on whether or not an electric field is applied. That is, the refractive index ellipsoid 105a rotates. Note that, the shape and the size of the refractive index ellipsoid 105a do not change so much.

As illustrated in FIGS. 6(e) and 6(f), the conventional VA mode liquid crystal display element is structured such that a liquid crystal layer 205 is sandwiched between a pair of substrates 201 and 202 which are provided face to face, and transparent electrodes 203 and 204 (electrode) are respectively provided on the substrates 201 and 202. When no electric field is applied, liquid crystal molecules of the liquid crystal layer 205 are aligned such that the long-axis direction of each of the liquid crystal molecules is substantially perpendicular to the substrate surface. When an electric field is applied, the liquid crystal molecules are aligned such that the long axis direction of each of the liquid crystal molecules is perpendicular to an electric field. As illustrated in FIG. 6(e), a typical refractive index ellipsoid 205a is aligned such that the main axis direction (long-axis direction) turns to the substrate normal direction when no electric field is applied. As illustrated in FIG. 6(f), the typical refractive index ellipsoid 205a is aligned such that the main axis direction is parallel to the substrate surface (substrate in-plane direction) when an electric field is applied. That is, in case of the VA mode liquid crystal display element, just like the TN mode liquid crystal display element, the shape of the refractive index ellipsoid 205a is an ellipse. The long-axis direction changes (the refractive index ellipsoid 205a rotates) depending on whether or not an electric field is applied. Moreover, the shape and the size of the refractive index ellipsoid 205a do not change so much.

As illustrated in FIGS. 6(*g*) and 6(*h*), the conventional IPS mode liquid crystal display element is structured such that a pair of electrodes 302 and 303 are provided face to face on a substrate 301. When an electric field (voltage) is applied from the electrodes 302 and 303 to a liquid crystal layer sandwiched between the substrate 301 and a counter substrate (not illustrated), liquid crystal molecules of the liquid crystal layer change their alignment directions (main axis direction (long-axis direction) of the refractive index ellipsoid 305a). Therefore, it is possible to realize different display states depending on whether or not an electric field is applied. That is, in case of the IPS mode liquid crystal display element, just like the TN mode liquid crystal display element and the VA mode liquid crystal display element, the shape and the size of the refractive index ellipsoid 205a do not change so much (that is, the refractive index ellipsoid 305a is an ellipse), but the main axis direction changes (the refractive index ellipsoid 305a rotates) depending on whether or not an electric field is applied.

Thus, according to the conventional liquid crystal display elements, the liquid crystal molecules are aligned in a certain direction (typically, in a single direction) when no electric field is applied. When an electric field is applied, the liquid crystal molecules change their alignment direction all together so as to carry out the display (modulation of transmittance). That is, although the shape and the size of the refractive index ellipsoid do not change (that is, the shape is an ellipse), only the main axis direction (long-axis direction) of the refractive index ellipsoid is rotated (changed) by applying an electric field, so that the display is carried out. Therefore, the long-axis direction of the refractive index ellipsoid is not limited to a direction perpendicular to or parallel to a direction of an electric field application. That is, according to the conventional liquid crystal display elements, the orientational order parameter of the liquid crystal molecules is substantially constant, and the display is carried out by changing the alignment directions (modulation of transmittance). That is, according to the conventional liquid crystal display elements, when an electric field is applied, the orientational order parameter is substantially constant, but a direction of an orientational easy axis changes.

Meanwhile, as illustrated in FIGS. 6(*a*) and 6(*b*) taking the display element 80 as an example, according to the display element which carries out the display by utilizing a change in an optical anisotropy caused by applying an electric field, including the display element 80 of the example embodiment, the refractive index ellipsoid 3a is spherical when no electric field is applied, that is, the refractive index ellipsoid 3a is optically isotropic when no electric field is applied (nx=ny=nz, orientational order parameter≈0 (substantially 0) in a scale not smaller than the wavelength of visible light). Moreover, the refractive index ellipsoid is optically anisotropic when an electric field is applied (nx>ny, orientational order parameter>0 in the scale not smaller than the wavelength of visible light), and the refractive index ellipsoid 3a becomes an ellipse (shows the optical anisotropy). Moreover the major axis direction of the refractive index ellipsoid 3a becomes perpendicular to the electric field application direction. That is, when the dielectric anisotropy of the dielectric material is negative (negative type liquid crystal), the major axis direction of the refractive index ellipsoid 3a is perpendicular to the electric field direction (perpendicular state) regardless of how much electric field is applied. When the dielectric anisotropy of the dielectric material is positive (positive type liquid crystal), the major axis direction of the refractive index ellipsoid 3a is parallel to the electric field direction (parallel state) regardless of how much electric field is applied. In the present invention, the electric field application direction and at least one of the major axis directions of the refractive index ellipsoid 3a are parallel or perpendicular to each other always. Note that, in the present invention, the orientational order parameter ≈0 in the scale not less than the wavelength of visible light indicates that the orientational order parameter is such a state: when the orientational order parameter ≈0 in the scale not less than the wavelength of visible light, a majority of the liquid crystal molecules or the like are oriented in a certain direction (there is an orientational order) when observed in a scale smaller than the wavelength of visible light, whereas, in the scale larger than the wavelength of visible light, the orientational directions of the molecules are averaged (that is, random) and there is no orientational order. Therefore, when the orientational order parameter ≈0 in the scale not less than the wavelength of visible light, the orientational order parameter is so small that it causes no effect on the light in the wavelength range of the visible light and the light larger than the wavelength of visible light. For example, when the orientational order parameter ≈0 in the scale equal to or greater than the wavelength of visible light, the black display is realized under crossed nicols. Furthermore, in the present invention, "the orientational order parameter >0 in the scale equal to or greater than the wavelength of visible light" indicates that the orientational order parameter in the scale equal to or greater than the wavelength of visible light is greater than the orientational order parameter of substantially 0. For example, when the orientational order parameter >0 in the scale equal to or greater than the wavelength of visible light, the white display (and/or gray display, which is a gradation display) is realized under crossed nicols.

That is, the display element which carries out the display by utilizing a change in an optical anisotropy which is caused by applying an electric field, including the display element 80 according to the example embodiment, is such that the molecules (molecules 8, cf. FIGS. 4(*a*) and 4(*b*)) are directed randomly in any directions when no electric field is applied. However, the molecules 8 are oriented in an order (orderly structure, orientational order) smaller than the wavelength of visible light (the orientational order parameter in the scale not smaller than the wavelength of visible light ≈0) and thus no optical anisotropy is caused. Therefore, the shape of the refractive index ellipsoid 3a is spherical as illustrated in FIG. 6(*a*). When the electric field is applied as illustrated in FIG. 6(*b*), orientational state of the respective molecules 8 is changed because the respective molecules 8 is directed along the in-plane direction of the substrates because the molecules 8 has the negative dielectric anisotropy. Moreover, when the orientation state is changed, the optical anisotropy is caused (the orientational order parameter in the scale not smaller than the wavelength of visible light >0) as a result of distortion occurred in the orderly structure smaller than the wavelength of visible light. As described above, as illustrated in the figure taking the display element as an example, the display element which carries out the display by utilizing a change in an optical anisotropy which is caused by applying an electric field, including the display element 80 in accordance with the example embodiment, is arranged such that, when no electric field is applied, the refractive index ellipsoid 3a has such a shape (nx=ny=nz) that causes the optical isotropy, and when the electric field is applied, the refractive index ellipsoid 3a has such a shape (nx>ny in the vicinity of the surface of the lower substrate (in FIG. 6(*b*), the substrate 1 located lower);

and ny>nx in the vicinity of the surface of the upper substrate (in FIG. 6(b), the substrate 2 located upper)) that causes the optical anisotropy, for example, as illustrated in FIG. 5(b). That is, the display element 80 in accordance with the example embodiment is arranged such that the shape and the size of the refractive index ellipsoid 3a are changeable by and according to the electric field applied thereon. Note that nx, ny, and nz are the principal refractive index of the direction parallel to the substrate surface (substrate in-plane direction) and along the direction in which the interleave electrodes 4 and 5 face each other, the refractive index of the direction parallel to the substrate surface (substrate in-plane direction) and perpendicular to the direction in which the interleave electrodes 4 and 5 face each other, and the principal index of the direction perpendicular to the substrate surface (substrate normal direction).

Figure 16:
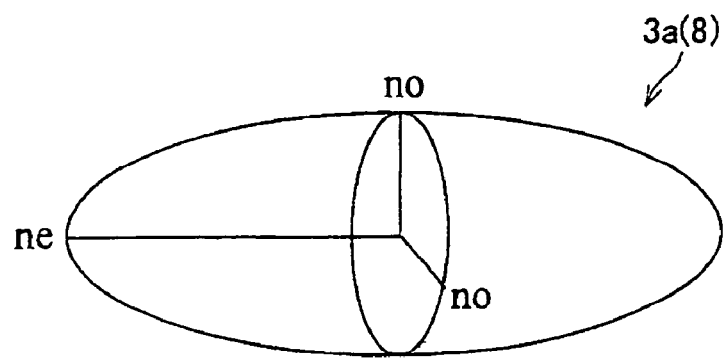
FIG. 16 is a schematic diagram schematically illustrating a shape of a refractive index ellipsoid of a single molecule in the display element illustrated in FIG. 1 when an electric field is applied.

Moreover, FIG. 16 is a schematic view illustrating the shape of the refractive index ellipsoid 3a of one molecule (molecule 8) in the medium A when the electric field is applied, in the display element 80 in accordance with the example embodiment. As illustrated in FIG. 24, the shape of the refractive index ellipsoid 3a is indicated as a cross section of the refractive index ellipsoid (ellipsoid) taken along a plane passing through an original point and perpendicular to a propagation (traveling) direction of light wave. As described above, the major axis direction of the ellipsoid is a component direction of the polarized light of the light wave, and a half of the length of the major axis corresponds to a refractive index along that direction.

The medium A according to the example embodiment is optically isotropic (in isotropic phase) when no electric field is applied, and becomes optically anisotropic when the electric field is applied thereon.

Where, as illustrated in FIG. 16, ne is the refractive index along the major axis direction of the ellipsoid (that is, the component direction of the polarized light of the light wave) due to the occurrence of the optical anisotropy when the electric field is applied, that is, the refractive index (extraordinary light refractive index) along the major axis direction of the refractive index ellipsoid 3a of the molecule 8, and no is the refractive index along the direction perpendicular to the major axis direction of the refractive index ellipsoid 3a, that is, the refractive index (ordinary light refractive index) along the minor axis direction of the refractive index ellipsoid 3a, the refractive index anisotropy ($\Delta n$) (change in birefringence) is expressed as follows:

$$\Delta n = ne - no.$$

That is, in the present invention, the refractive index anisotropy (A n) indicates the change in the birefringence expressed as $\Delta n = ne - no$ (ne: extraordinary light refractive index, no: ordinary light refractive index). ne and no are changed in the present invention, but not in the conventional liquid crystal display element/device.

The major axis direction of the refractive index ellipsoid 3a is parallel to the electric field application direction when the electric field is applied (in case of the medium having the positive dielectric anisotropy), or the major axis direction of the refractive index ellipsoid 3a is perpendicular to the electric field application direction when the electric field is applied (in case of the medium having the negative dielectric anisotropy).

On the other hand, in the conventional liquid crystal display element, the display operation is carried out by utilizing the rotation ng of the major axis direction of the refractive index ellipsoid by on the basis of the electric field application. Thus, in the conventional liquid crystal display element, the major axis direction of the refractive index ellipsoid is not always parallel or perpendicular to the electric field application direction.

Thus, according to the display element 80 of the example embodiment, the direction of the optical anisotropy is constant (electric field application direction do not change), and the display is carried out by, for example, changing the orientational order parameter in the scale not smaller than the wavelength of visible light. The magnitude of the optical anisotropy (for example, the orientational order in the scale not smaller than the wavelength of visible light) of the medium A itself is changed. Therefore, the display element of the example embodiment is totally different from the conventional display elements in terms of the display principle.

Note that, the medium A sealed between the substrates 1 and 2 to form the medium layer 3 may be any medium provided that the magnitude of the optical anisotropy thereof is changeable by and according to the electric field applied thereon. For example, the medium A may be such a medium that is substantially optically isotropic (the orientational order parameter in the scale not smaller than the wavelength of visible light >0) when the electric field is applied or when no electric field is applied, and in which optical modulation is induced by the electric field application (that is, the medium becomes optically anisotropic or isotropic by the electric field application). Moreover, the medium A may be such a material (medium) in which the orientational order parameter in the scale not smaller than the wavelength of visible light is increased among the molecules 8 or molecular agglomerations (clusters) by and according to the application of the electric field (it is further increased from a value of the orientational order parameter in a state where the optical modulation is already induced (the orientational order parameter in the scale not smaller than the wavelength of visible light >0)). Moreover, the medium A may be a medium in which the orientational order parameter in the scale not smaller than the wavelength of visible light (magnitude of the optical anisotropy) is decreased among the molecules 8 or the molecular agglomerations by the and according to the application of electric field, compared with the orientational order parameter before the application of the electric field. For example, the medium A may be a medium which is changed from an optical anisotropic state (where the orientational order parameter in the scale not smaller than the wavelength of visible light >0) to an optical isotropic state (where the orientational order parameter in the scale not smaller than the wavelength of visible light ≈0).

In the present invention, to change in the magnitude of the optical anisotropy of the medium A by and according to electric field applied on the medium A indicates that, as described above, is to change the refractive index ellipsoid 3a by and according to the electric field applied on the medium A. In the aforementioned arrangement in which the medium A is optically isotropic when no electric field is applied and the magnitude of its optical anisotropy is changeable by and according to the electric field applied thereon, that is, in the arrangement in which the optical anisotropy of the medium A is generated when the electric field is applied, the shape of the refractive index ellipsoid 3a is changed from the spherical shape to the ellipsoidal shape by and according to the electric field applied thereon. On the other hand, in the arrangement in which the medium A is optically isotropic when no electric field is applied thereon, but becomes optically isotropic when the electric field is applied, the shape of the refractive index ellipsoid 3a is changed from the ellipsoidal shape to the spherical shape by and according to the electric field applied thereon. Moreover, in the arrangement in which the medium A is optical anisotropic when no electric field is applied and the magnitude of its optical anisotropy becomes higher or lower by and according to the electric field application, compared with the magnitude of its optical anisotropy attained when no electric field is applied, a major axial length or a minor axial length of the refractive index ellipsoid is changed (extended or shortened) whereby a ratio between the major axial length and the minor axial length of the refractive index ellipsoid is changed between before and after the electric field application (as a result, or example, curvature is changed). For example, in case where the magnitude of the optical anisotropy becomes higher when the electric field is applied, the electric field application causes the ellipsoid to have a larger ratio of its major axial length over its minor axial direction compared with the ratio attained when no electric field is applied. In case where the magnitude of the optical anisotropy becomes lower when the electric field is applied, the electric field application causes the ellipsoid to have a smaller ratio of its major axial length over its minor axial direction compared with the ratio attained when no electric field is applied (that is, the ratio gets closer to 1; the ratio in this case may be such a ratio with which the ellipsoid becomes substantially spherical).

As illustrated by the display element 80 of the example embodiment in FIG. 4(a), in the display element which carries out the display operation by utilizing a change in an optical anisotropy caused by applying an electric field, the medium A sealed in a space between the substrates 1 and 2 is in the isotropic phase when no electric field (voltage) is applied to the interleave electrodes 4 and 5, and the medium A is optically isotropic. On this account, the black display is carried out.

Meanwhile, as illustrated in FIG. 4(b), when an electric field (voltage) is applied to the interleave electrodes 4 and 5, each of the molecules 8 in the medium A is aligned such that the long-axis direction of the molecule 8 is along the electric field formed between the interleave electrodes 4 and 5. Therefore, the double refractive phenomenon is expressed. As illustrated in FIG. 5, due to the double refractive phenomenon, it is possible to modulate transmittance of the display element 80 according to the voltage between the interleave electrodes 4 and 5.

Note that, at a temperature which is very far from a phase transition temperature (transition point), a high voltage is required in modulating the transmittance of the display element 80. However, at a temperature which is just above the transition point, it is possible to adequately modulate the transmittance of the display element with a voltage from 0V to about 100V.

For example, according to "D. Demus and three others, "Handbook of Liquid Crystals Low Molecular Weight Liquid Crystal", Wiley-VCH, 1998, Vol. 1, p. 484-485" (hereinafter referred to as "Non-patent Document 9") and Non-patent Document 12, in cases where the refractive index of the electric field direction is n// and the refractive index of the direction perpendicular to the electric field direction is n⊥, a relationship between double refractive change ($\Delta n = n// - n\perp$) and the outer electric field, that is, the electric field E (V/m) is shown by:

$$\Delta n = \lambda \cdot B_k \cdot E^2 \qquad (3)$$

Note that, $\lambda$ is a wavelength (m) of the incident light in a vacuum, and Bk is Kerr constant (m/V2), and E is an applied electric field intensity (V/m).

It is well-known that, with a rise in temperature (T), Kerr constant B decreases according to a function proportional to $1/(T-T_{ni})$. It is possible to drive the molecules with low electric field intensity when the temperature is around the transition point ($T_{ni}$). However, high electric intensity is steeply required with a rise in temperature (T). On this account, at a temperature which is very far from the transition temperature (a temperature which is enough higher than the transition temperature), a high voltage is required in modulating the transmittance of the display element. However, at a temperature which is just above the phase transition point, it is possible to adequately modulate the transmittance of the display element with a voltage of about 100V or less.

Note that, the maximal transmittance is obtained by applying a voltage of about 100V to the display element 80, which is illustrated in FIGS. 3(a) and 3(b), and in which ITO is used for the interleave electrodes 4 and 5, and the line width of the interleave electrodes 4 and 5 is 5 μm, and the distance between the electrodes is 5 μm, and the thickness of the electrode is 3 μm, and the distance between the substrates (distance between the substrates 1 and 2, that is, thickness of the medium layer 3) is 10 μm, and 5CB is used for the medium A.

Note that, the medium layer 3 can be used in a shutter-type display element in which the optical anisotropy is expressed with a rise in the orientational order parameter in the electric field application direction and the transmittance changes. Therefore, the maximal transmittance is obtained when the anisotropy direction is at an angle of 45° with respect to a direction of each of the polarizing plate absorption axes which are orthogonal with each other. Note that, when a direction in which the optical anisotropy of the medium A is expressed is at an angle of ±θ (degree) with respect to the polarizing plate absorption axis, the transmittance (P) is estimated by the following relational formula (4):

$$P(\%) = \sin^2(2\theta) \qquad (4).$$

For example, in cases where the transmittance is 100% when an angle θ is 45°, humans feel that the transmittance of 90% or more is the maximal brightness. Therefore, humans feel that the brightness is substantially maximum or close to maximum when θ is $35° \leq \theta < 55°$. Therefore, it is preferable that θ be $35° < \theta < 55°$, most preferably, θ be 45°.

For this reason, in the display element 80 of the example embodiment, as FIG. 2 shows, polarizers 6 and 7 provided on the respective substrates 1 and 2 are formed in such a manner as to have respective absorption axes 6a and 7a crossing each other perpendicularly, i.e. absorption axial directions of the polarizers 6 and 7 are perpendicular to each other. Moreover, the absorption axes 6a and 7a are arranged so as to intersect, at an angle of 45°, with a longitudinal direction of teeth-shaped sections 4a and 5a of the interleave electrodes 4 and 5. In this manner, the absorption axes 6a and 7a of the respective polarizers 6 and 7 are arranged so as to be approximately at an angle of 45° with respect to the field effect direction of the interleave electrodes 4 and 5.

Figure 7:
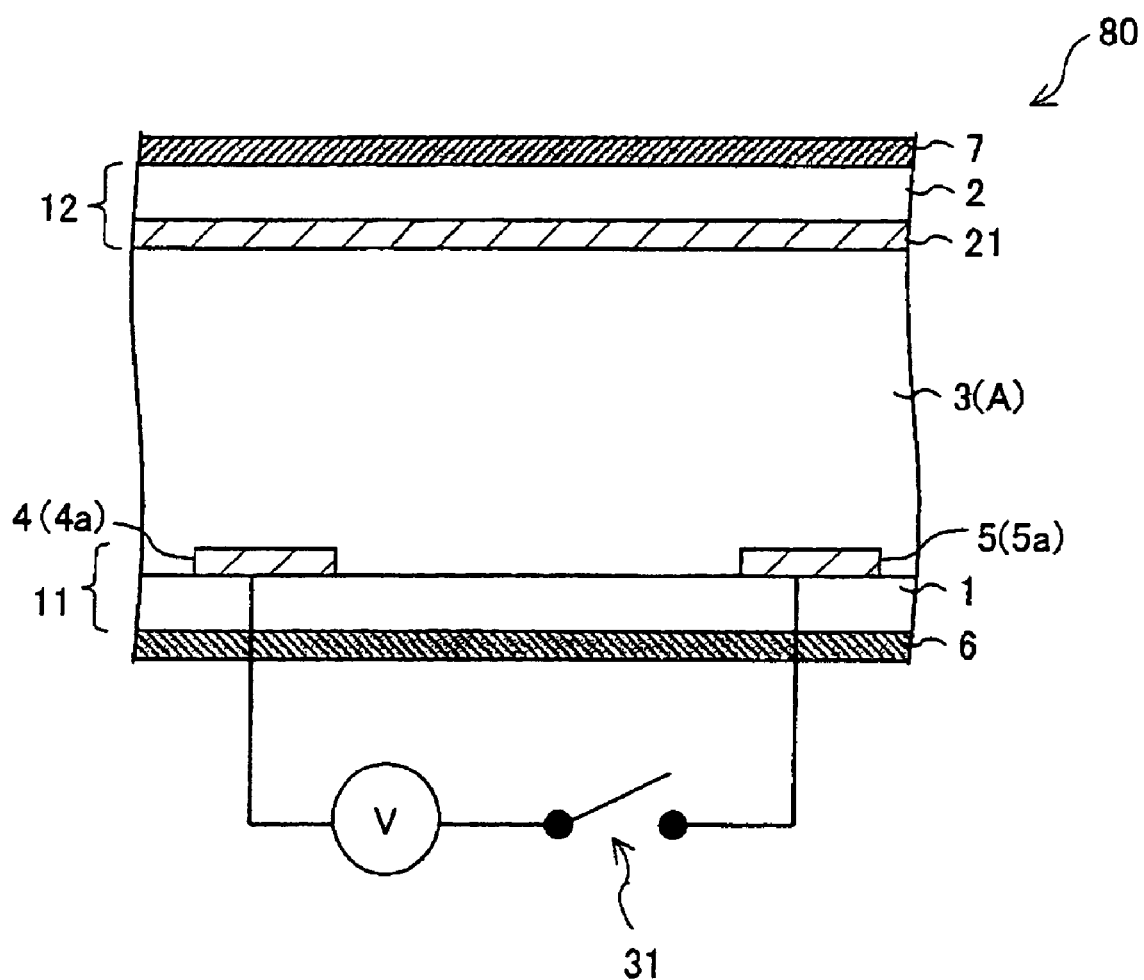
FIG. 7 is a cross sectional view schematically illustrating an example of an arrangement of various parts of the display element illustrated in FIG. 1, which is provided with a switching element.
Figure 8:
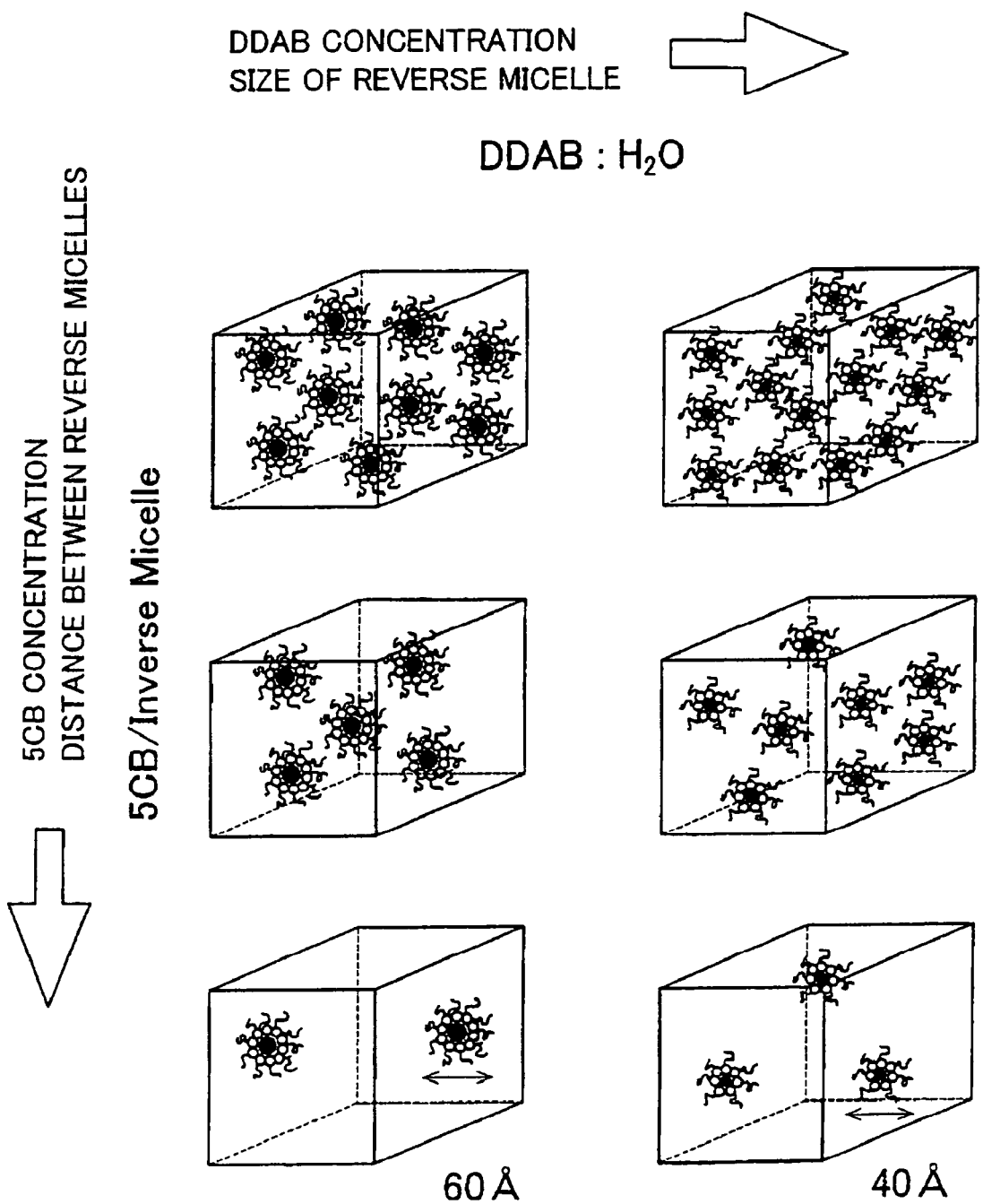
FIG. 8 is a schematic view illustrating one example of a reverse micelle phase mixture system of a liquid crystal microemulsion.
Figure 9:
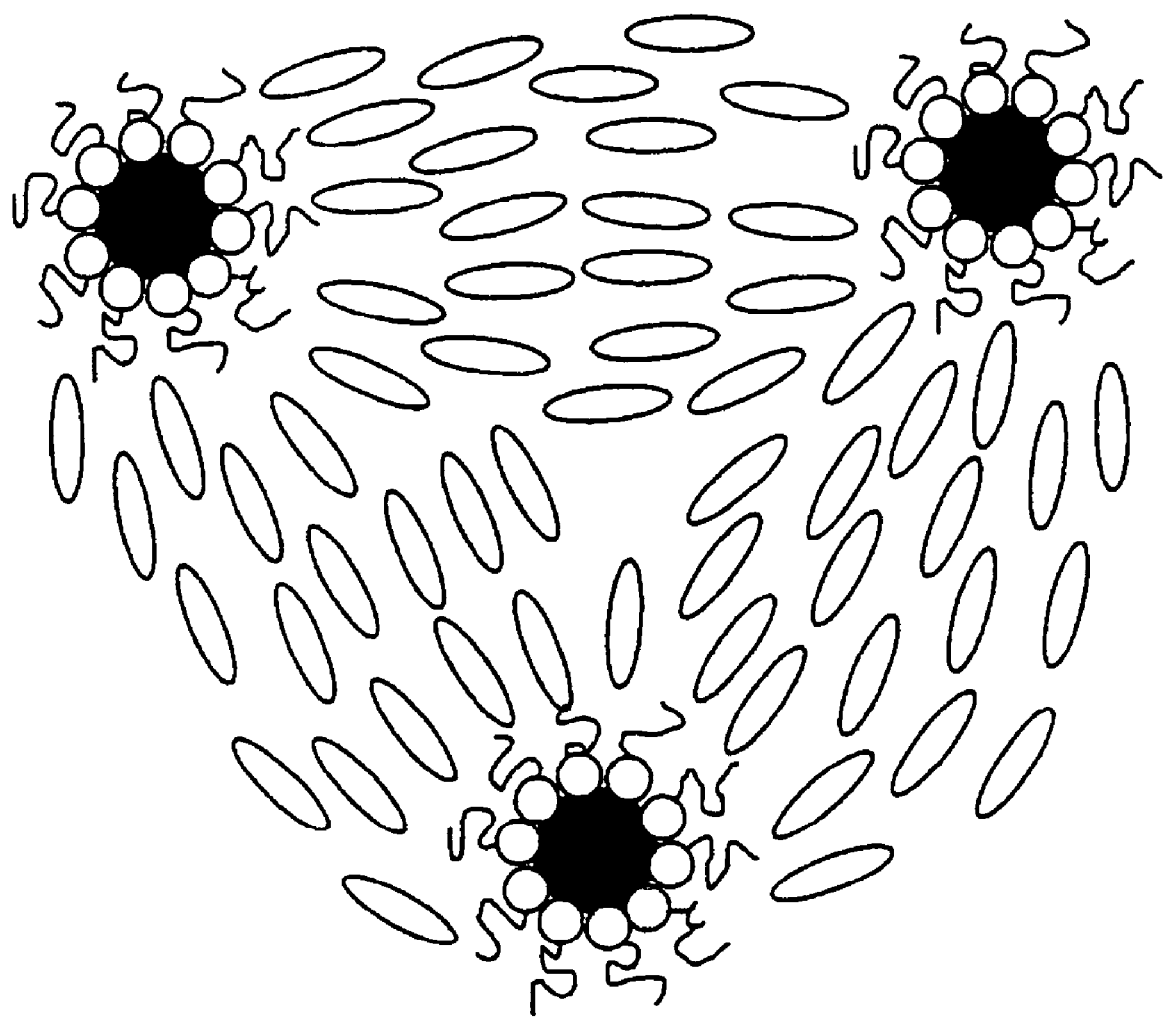
FIG. 9 is a schematic view illustrating another example of the reverse micelle phase mixture system of the liquid crystal microemulsion.
Figure 11:
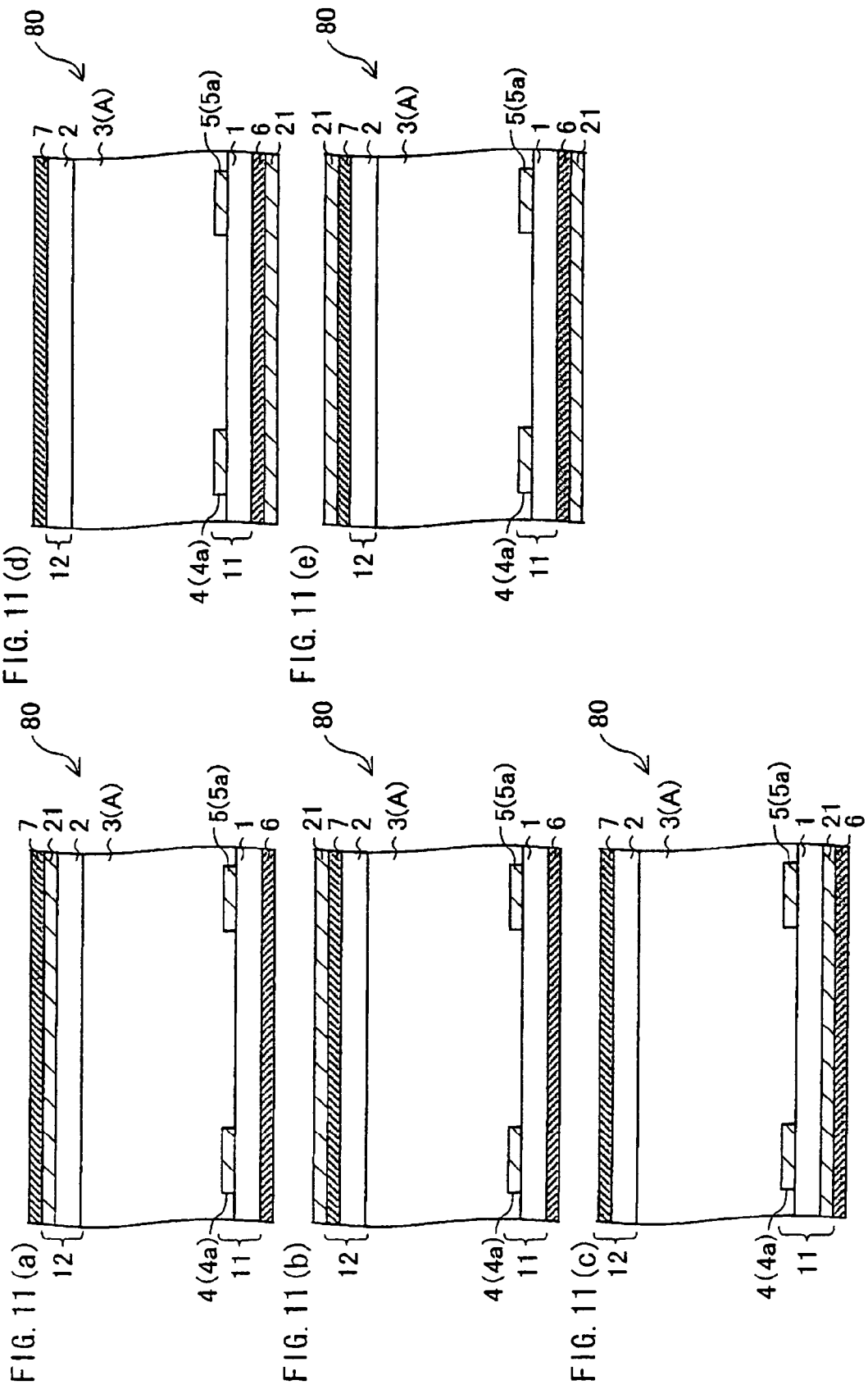
FIGS. 11(*a*) to 11(*e*) are cross sectional views schematically illustrating an example of an arrangement of various parts of another display element according to one embodiment of the present invention.

Meanwhile, a display element for comparison was manufactured in a manner identical with the display element 80 of the example embodiment, except that the electrode 21 is not provided in the element for comparison. As shown in FIG. 7, each of these display elements was, as a switching element, provided with an FET (Field-Effect Transistor) 31 that switches ON/OFF electric field application to the interleave electrode 4 and 5, and the display characteristics of these display elements were observed. As a result, the brightness variation was observed in the display element for comparison with no electrode 21.

On the other hand, as shown in FIG. 1, in the example embodiment, the electrode 21 made of ITO is provided on the inner side of the counter substrate 12, and this electrode 21 is provided with an electrical potential identical with the GND, i.e. identical with the electrical potential of the interleave electrodes 4 and 5 of the display element 80, to which no electric field is applied. With this, the variation of the brightness is restrained.

The variation of the brightness is restrained in this manner, presumably because of the following reason: In the display element having no electrode 21, e.g. as illustrated in FIG. 1, static electricity influences on the inside of the cell and a medium A reacts to the static electricity, so that the brightness is varied. On the other hand, in the display element 80 shown in FIG. 1, the electrode 21 (in this case, transparent electrode) shields the static electricity, so as to restrain the aforesaid problem.

In reality, in a case where the display element was not provided with the electrode 21 and an object charged with static electricity was brought into contact with the display element, the leakage of light occurred particularly at the time of black display, so that display failures such as the decrease of contrast were induced. On the other hand, in a case where the electrode 21 was provided, the display failures did not occur at all, even if an object charged with static electricity was brought into contact with the display element.

It was also discovered that the electrode 21 is not required to have zero potential, because the aforesaid effect was obtained on condition that the electrical potential of the electrode 21 was fixed at a certain value and the electrode 21 was not in an electrically completely floating state, i.e. electrical connection to the electrode 21 was not completely cut off. Moreover, it was discovered that the aforesaid effect was enhanced when the electrode 21 was fixed at (connected to) the GND.

Furthermore, when the electrode 21 is provided in the display element, the display unevenness due to the unevenness of temperature can be restrained. The following will discuss why this can be realized.

For instance, as in the case of the display element disclosed by the aforementioned patent document 1, the display element of the example embodiment reproduces an image with the medium A being kept near a nematic-isotropic phase transition temperature. In this case, the transmittance greatly varies if the temperature is not kept within the range of ±0.1K at least.

In theory, the optical anisotropy on account of the application of an electric field is represented by the following Equation (5) that is derived from the aforesaid Equation (3):

$$\Delta n = C \cdot E^2 = C \cdot (V/ds)^2 \quad (5).$$

Note that $\Delta n$ is a birefringence ratio ($\Delta n = n_{//} - n_{\perp}$), E is an applied electric field (V/m), V is an applied voltage (V), ds is a distance (m) between the electrodes, and C is a constant ($m^2/V^2$). C is typically represented by $\lambda \cdot B_k$ ($\lambda$ is an wavelength (m) of the incident light in vacuum and $B_k$ is the Kerr constant ($m/V^2$)).

The Kerr constant $B_k$ is, as described above, represented by the following Equation (6):

$$B_k \propto 1/(T-T_{ni}) \quad (6).$$

As the equation shows, it is known that the Kerr constant decreases in accordance with a function in proportion to $1/(T-T_{ni})$, as the temperature (T) of the display element increases. The Kerr constant $B_k$ is thus easily affected by temperature (T).

For this reason, in the display element utilizing the Kerr effect, the optical anisotropy ($\Delta n$; complex refractive index) of the medium A in the medium layer 3 greatly varies with slight unevenness of the temperature, so that the transmittance greatly varies as a result. For this reason, non-uniformity and unevenness in a displayed image occur.

On the contrary, when the medium layer 3 is covered with a substance with a high thermal conductivity as in the case of the display element 80 of the example embodiment, the temperature unevenness is restrained and hence the display characteristics are improved.

An organic matter (e.g. the medium A and polarizers 6 and 7) typically has a heat conductivity of about 0.2 W/m·K, while substrates 1 and 2 (a glass substrate, for instance) typically have a thermal conductivity of about 0.8 W/m·K. On the contrary, ITO, which can be used to form the transparent electrode has a heat conductivity of about 8 W/m·K, which is ten time larger than that of the glass substrates. In general, electrically conductive materials have large heat conductivity. Therefore, if the medium A is covered with an electrically conductive material such as ITO or the like, it is possible to prevent the temperature unevenness.

The prevention of the temperature unevenness can be attained both in the arrangement in which the electrode 21 is provided between the substrates 1 and 2 in the display element, and the arrangement in which the electrode 21 is provided outside of the substrates 1 and 2 (that is, not between them) in the display element.

Peripheral environment, light source (back light) for the display element, and the shape of the display element are considered as possible causes for the temperature unevenness. Especially, the peripheral environment is a variable factor that can be varied regardless of the design of the display device. Therefore, a special counter measures are necessary. It was found that the arrangement in which the electrically conductive material is provided outside of the substrates 1 and 2 in the display element (i.e., as an outermost component of the display element) is most effective.

This effect cannot be attained in the conventional liquid crystal display elements. In the conventional liquid crystals, values in their properties are not varied at temperature of several K. In the display element in which the change in the magnitude of the optical anisotropy is utilized to perform the display operation, the temperature is changed significantly in principle. Therefore, the above effect is attained in the display element in which the change in the magnitude of the optical anisotropy is utilized to perform the display operation.

In the display element 80 according to the example embodiment, the electrode 21 can gives the shield effect without reducing the driving voltage substantially when it satisfies di>S as illustrated in FIG. 1, where S is a distance (electrode-electrode distance) between the interleave electrodes 4 and 5, and di is a distance between (a) the interleave electrodes 4 and 5, and (b) the electrode 21. However, even if di<S, it is possible to attain the static electricity shield effect and the prevention of the temperature unevenness, even though the driving voltage becomes high. Especially if di>3 µm, even thought the driving voltage becomes high, the transmittance is not sacrificed as long as the voltage is high. Because $\Delta n$ is typically approximately 0.1 when the medium A is oriented perfectly, it is preferable that di·$\Delta n$=about 300 nm at least (>$\lambda/2$), in order to maintain the transmittance. Therefore, it is preferable that di>3 µm.

In the present invention is not limited to the example embodiment which mainly discusses the arrangement in which, as illustrated in FIG. 1, the electrode 21 is provided in association with (e.g. on) the inner side (i.e. facing side) of the substrate 2. For example, the electrode 21 may be provided (i) between the substrate 2 and the polarizer 7 as illustrated in FIG. 11(a), (ii) outside of the polarizer 7 as illustrated in FIG. 11(b), (iii) between the substrate 1 and the polarizer 6 as illustrated in FIG. 11(c), and (iv) outside of the polarizer 6 as illustrated in FIG. 11(d). In other words, the electrode 21 may be provided (i) on the pixel electrode 11 or opposing electrode 12, (ii) outside of the pixel electrode 11 or opposing electrode 12, or (iii) on both front and reverse surfaces of the pixel electrode 11 or opposing electrode 12.

As described above, there is no particular limitation in the location of the electrode 21. However, it is preferable to provide the electrode 21 between the substrate 1 and 2, that is, in association with (e.g. on) the inner side (i.e. facing side) of the substrates 1 and/or 2, because this allows the electrode 21 to be closer to (in a greater vicinity of) the medium layer 3, thereby attaining higher shielding effect.

The display element 80 according to the example embodiment is hardly affected from the electric field, unlike the liquid crystal display element of the IPS mode. Thus, it is possible to provide the electrode 21 in association with (e.g. on) that facing (inner) side of at least one of the substrates 1 and 2, which faces against a facing side of the other, as described above.

As described above, there is no particular limitation in the location of the electrode 21. The effect is attained as long as the electrode 21 is so provided as to overlap the display section (the display element, specifically, the region (display region) where the light passes in the opposing electrode 12) in each pixel 71.

Moreover, it is more preferable that the electrode 21 be provided to the both of the electrodes 1 and 2, for example, as illustrated in FIG. 11(e) (i.e. both of the substrates 1 and 2 be shielded). The display element 80 prepared by using, in combination, the counter substrate 12 illustrated in any one of FIGS. 1, 11(a), and 11(b), and the pixel substrate 11 illustrated in any one of FIGS. 11(c) and 11(d), is especially preferable because it has a greater shielding effect.

In the display element 80, a region that contributes to the response (optical response) of the medium A, that is, to the display operation is only the region between the interleave electrodes 4 and 5 (i.e. between the teeth portions 4a and 5a). Therefore, the shielding effect can be attained similarly in an arrangement in which the shield elect 21 is omitted right above the interleave electrodes 4 and 5 wherein omitted portion of the interleave electrode 21 has the same width as the interleave electrodes 4 and 5, or a width smaller than those of the interleave electrodes 4 and 5.

It is preferable that the electrode 21 be formed in the whose region that contributes to the display operation. In other words, it is preferable that the electrode 21 be formed at least in the region that contributes to the display operation. This arrangement is preferable because it attains more remarkable shield effect. However, it is not necessary that the electrode 21 are formed in the whose region that contributes to the display operation.

That is, the electrode 21 may be patterned (i.e. formed in a line shape) at pattern intervals, for example, larger than the gap between the interleave electrodes 4 and 5 (teeth-portions 4a and 5a). For example, the electrodes may be formed in part of gaps between the interleave electrodes 4 and 5 when viewed from above.

That is, the display element 80 according to the example embodiment may be arranged such that the electrode 21 has a gap R smaller than the width L of the interleave electrodes 4 and 5 (R<L) in the region in which the electrode overlaps with the interleave electrodes 4 and 5. Alternatively, the display element 80 according to the example embodiment may be arranged such that the electrodes 21 is so formed as not to overlap the interleave electrodes 4 and 5 (that is, the gap R is equal to or larger than the width L of the interleave electrodes 4 and 5 (R≧L)).

More specifically, the display element 80 may be, as described above, arranged as to comprise (a) a plurality of picture elements (pixels 71) including at least one pair of electrodes, each of the picture elements having at least one domain $D_M$ (minute region), and (b) a electrode formed in a region overlapping the domain $D_M$, for example, in the domain $D_M$, where one domain $D_M$ (cf. FIG. 2) is a region in which the direction of the optical anisotropy of the medium A when the electric field is applied or when no electric field is applied (i.e. the direction of the optical anisotropy of the medium A when the optical anisotropy appears). In this arrangement, the electrode 21 may be arranged such that it overlaps part or whole of the domain $D_M$.

Further, the electrode 21 may be arranged such that it overlap two or more consequent (adjacent) pixels 71. More specifically, the electrode 21 may be provided, for example, to cover the whole surface of at least one of the substrates (i.e. to cover the whole of the other principal plane of the substrates than the principal plane of the substrates on which the first and the second electrodes are provided, where the principal plane is a surface of one of the substrates but the other principal plane is any one of that surface of the one of the substrates and surfaces of the other one of the substrates). Further, the electrode 21 may be provided, for example, to cover at least that region of at least one of the substrates which corresponds to a display screen (i.e. a whole area of a part of the principal plane of one of the substrates which corresponds to the display screen). Alternatively, the electrode 21 may be provided per pixel 71 so that the electrodes 21 are provided independently from each other (here, principal surfaces of the substrates encompass front and/or back surfaces of the substrates).

The electrode 21 has a simple configuration in the arrangement in which the electrode 21 is provided to cover at least that region of at least one of the substrates which corresponds to the display screen (i.e. that region which overlaps the display screen).

When assembling together the pixel substrates 11 and the counter substrate 12 on which the thus patterned electrode 21 is provided (i.e. in panel alignment process of the pixel substrate 11 and the counter substrate 12), poor alignment between the pixel substrate 11 and the counter substrate 12 results in that a gap between the interleave electrodes 4 and 5 and the electrode 21 becomes large (i.e. that part of the aperture section which is not overlapped with the electrode 21 is formed). The electric field is leaked through the gap (i.e. the not-overlapped part of the aperture section), whereby the shielding effect is deteriorated accordingly. Therefore, in order to attain a better shielding effect, it is preferable that the patterning of the electrode 21 is so designed that there is a region (overlapping region) in which the electrode 21 overlaps the interleave electrodes 4 and 5. This reduces defective panel alignment between the pixel substrate 11 and the counter substrate 12. However, highly accurate patterning is not necessary in the arrangement in which the electrode 21 is provided to overlap at least that region of at least one of the substrates which corresponds to a display screen.

With this arrangement in which the electrode 21 is provided to overlap at least that region of at least one of the substrates which corresponds to the display screen, it is possible to shorten the formation process of the electrode 21.

With the arrangement in which at least part of the electrode 21 is omitted in the region, in the pixel 71, that overlaps the interleave electrodes 4 and 5, preferably the electrode 21 is so formed as to avoid the region that overlaps the interleave electrodes 4 and 5, it is possible to alleviate the load capacitance that is generated between (a) the electrode 21 and (b) the interleave electrodes 4 and 5, thereby improving the charging characteristics of charging performed by the switching element 81, such as TFT or the like.

Moreover, in this arrangement, the patterned electrode 21 (formed in the line shape) can be used as a heater electrode (heating means (heating member) for heating the medium A) by flowing a constant current through the thus patterned electrode 21. This arrangement to use the electrode as the heater electrode is quite effective in a case where the medium A used in the present invention is largely dependent on temperatures, or in a case where applicable temperature range is narrow.

With the arrangement in which the display element 80 is provided with the electrode 21 (which functions as a third electrode acting as a shielding electrode) in addition to the interleave electrodes 4 and 5 (having teeth portions 4a and 5a) as the first and second electrodes, that is, the display element 80 has the additional electrode (i.e. the electrode 21) formed, among the principal planes of the substrates, on the other principal plane than the principal plane on which the interleave electrodes 4 and 5 (teeth portions 4a and 5a) are formed, it is possible to ground the static electricity (potential) applied on the display element 80 (i.e to shield the display element 80 from the static electricity), thereby protecting the display element 80 from the static electricity. In this way, it is possible to prevent the display unevenness due to the change in the brightness and temperature unevenness caused when the medium A responds to the static electricity.

In the example embodiment, by the wording "the electrode 21 is formed on the other principal plane than the principal plane on which the interleave electrodes 4 and 5 are formed", it is meant that the electrode 21 is formed on the plane different from the plane on which the interleave electrodes 4 and 5 (the teeth portions 4a and 5a) are formed, in other words, on a layer different from a layer in which the interleave electrodes 4 and 5 (the teeth portions 4a and 5a) are formed. For example, the wording indicates that, the electrode 21 is formed (provided) on that side of the substrate 1 which is opposite to the side on which the interleave electrodes 4 and 5 (teeth portions 4a and 5a) are formed (provided). Further, for instance, the wording indicates that, the electrode 21 is formed on the substrate 2 where the interleave electrodes 4 and 5 (teeth portions 4a and 5a) are formed on the substrate 1.

However, it is not necessary that the electrode 21 is formed immediately on the surface of the substrate. The electrode 21 may be provided in a distance from the surface of the substrate, provided that the electrode 21 is formed on the other principal plane than the principal plane on which the interleave electrodes 4 and 5 are formed, among the principal planes of the substrates.

As described above, according to the example embodiment, it is possible to attain a stable display element that is free from the influence of the static electricity.

Note that, in the example embodiment, the transmission-type display element is used as an example of the display element 80 of the example embodiment. However, the present invention is not limited to this, and it is possible to use a reflection-type display element as an example of the display element 80.

Figure 12:
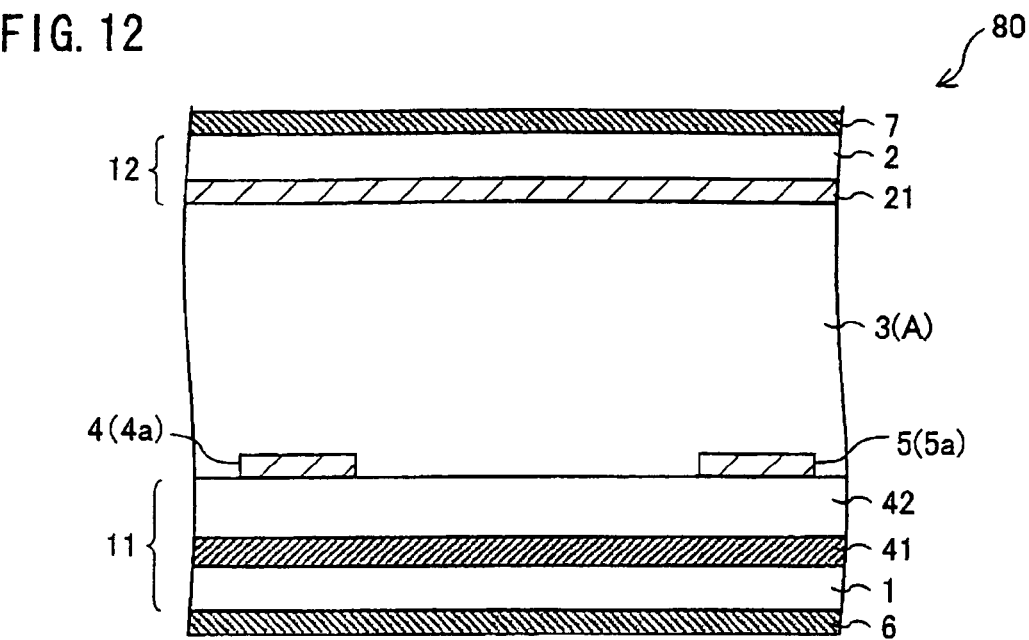
FIG. 12 is a cross-sectional view illustrating one example of a schematic arrangement of a reflection-type display element in accordance with one embodiment of the present invention.
Figure 13:
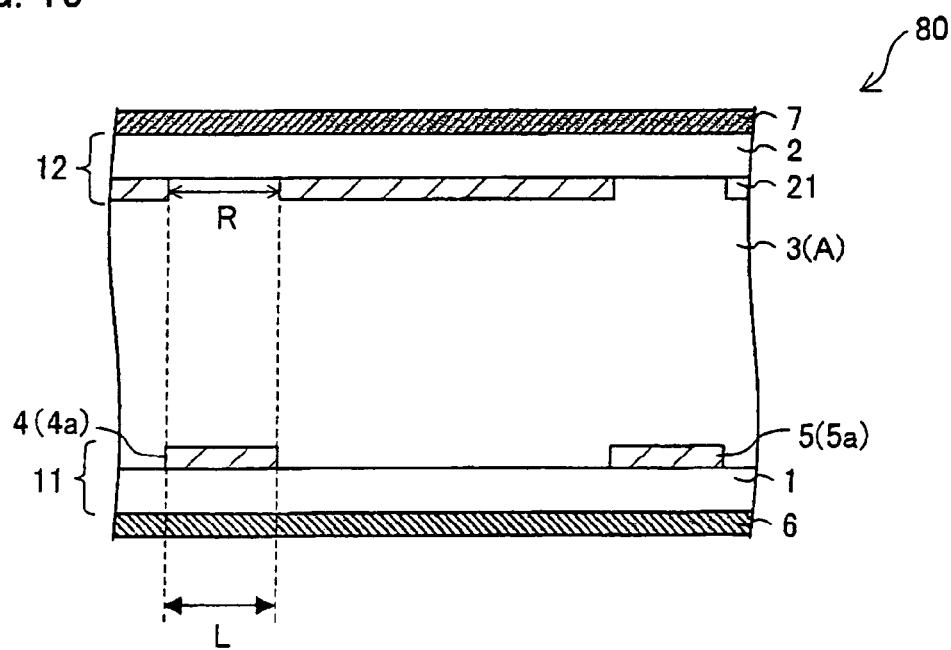
FIG. 13 is a cross sectional view schematically illustrating an example of an arrangement of various parts of still another display element according to one embodiment of the present invention.

FIG. 12 is one example of a schematic arrangement of a reflection-type display element in accordance with the example embodiment as the display element 80 of the example embodiment. Note that, the present invention is applied to the reflection-type display element.

In the reflection-type display element 80, a pixel substrate 11 is structured such that a reflection layer 41 is provided above a substrate 1 which is a glass substrate or the like, and interleave electrodes 4 and 5 made of ITO or the like are provided above the reflection layer 41 with an insulating layer 42 interposed therebetween. The rest of the arrangement of the reflection-type display element is the same as the above-mentioned. FIG. 12 illustrates an example where the electrode 21 is provided with respect to the inner side of the substrate 2. The insulating layer 42 may be an organic film (acrylic resin, etc.), an inorganic film (silicon nitride, silicon dioxide, etc.), or the like. Moreover, as the reflection layer 41, it is possible to apply an aluminum thin film, a silver thin film, or the like. In the above arrangement, the reflection layer 41 can reflect light incoming from another substrate 2 which is a transparent substrate such as a glass substrate or the like. Therefore, it is possible to function as the reflection-type display element.

Note that, when the display element 80 of the example embodiment is used as the reflection-type display element, not only transparent electrode materials (such as ITO which is used when the display element is used as the transmission-type display electrode) but also various materials (which are conventionally well-known as electrode materials such as metal electrode materials (aluminum, etc.)) can be used for the interleave electrodes 4 and 5. Moreover, in this case where the electrode 21 is provided in association with (e.g. on) the pixel substrate 11, various material well known as electrode materials can be used for the electrode 21 in lieu of the transparent electrode material such as ITO and the like: the electrode 21 may be made of a metal electrode material or the like, such as aluminum or the like. The line width of the interleave electrodes 4 and 5 and the electrode and the distance (electrode interval) between the electrodes 4 and 5, and between the electrode 21 and the electrodes 4 and 5 are not especially limited. It is possible to set up arbitrarily, for example, according to a gap between the substrate 1 and the substrate 2.

Furthermore, the example embodiment explained, as an example, a case where glass substrates are used as the substrates 1 and 2. However, the present invention is not limited to this, and the substrates 1 and 2 may be of any kind as long as at least one of the substrates 1 and 2 is a transparent substrate. For example, it is possible to use various substrates which are conventionally well-known.

Note that, the substrates 1 and 2 are not limited to substrates which are conventionally used, but may be a film-type substrate, or a substrate having flexibility. As long as at least one of the substrates is transparent, and the medium A can be kept (sandwiched) between the substrates (inside the means for holding the medium), that is, the medium A can be kept (sandwiched) inside, it is possible to use variety of materials according to the kind of the medium A, the state of the phase, and the like.

Moreover, the example embodiment explained, as a concrete example, a case where the medium A is made of a material which is optically isotropic when no electric field is applied and is optically anisotropic when a voltage is applied. However, the present invention is not limited to this. As mentioned above, the medium A may be such a material that anisotropy is lost by applying a voltage and the optical isotropy is expressed.

The following description deals with a concrete example. The medium A used in the concrete example is such a material that anisotropy is lost by applying a voltage and the optical isotropy is expressed.

In the present concrete example, the substrates 1 and 2 are transparent, and are glass substrates. The transparent interleave electrodes 4 and 5 made of ITO and the alignment film made of polyimide are formed on the substrate 1 so as to be positioned in a counter surface which faces the substrate 2 (faces a counter surface of the substrate 2). Moreover, the medium A is injected and sealed between the substrates 1 and 2. The medium A is 4'-n-alkoxy-3'-nitrobiphenyl-4-carboxylic acid (ANBC-22), which is a transparent dielectric material. Plastic beads are scattered onto the counter surfaces of the substrates 1 and 2 in advance, so that a thickness of the medium layer 3 in the display element 80 is adjusted to be 4 μm.

Note that, as mentioned above, the polarizing plate 6 is provided on an outer surface of the substrate 1 (rear surface with respect to the counter surface of the substrate 1) and the polarizing plate 7 is provided on an outer surface of the substrate 2 (rear surface with respect to the counter surface of the substrate 2). The absorption axis 6a of the polarizing plate 6 is orthogonal to the absorptions axis 7a of the polarizing plate 7. Moreover, the absorption axis 6a is at an angle of about 45° with respect to a direction in which the comb-teeth portion 4a of the interleave electrode 4 extends, and the absorption axis 7a is at an angle of about 45° with respect to a direction in which the comb-teeth portion 5a of the interleave electrode 5 extends.

The display element 80 thus obtained is kept at about a smectic C phase/cubic phase transition temperature (at a temperature which is lower than the phase transition temperature, and is higher than a temperature about 10K lower than the phase transition temperature) by using an outer heating device (heating means). When a voltage (alternating electric current of about 50V (greater than 0 up to several hundred kHz)) is applied to the display element, the transmittance can be changed. That is, when an electric field is applied to the display element in the smectic C phase (bright state) which is optically anisotropic when no electric field is applied, the smectic C phase can be changed into a cubic phase (dark state) which is isotropic.

Note that, in the above concrete example, the absorption axis 6a of the polarizing plate 6 is at an angle of 45° with respect to the direction in which the comb-teeth portion 4a of the interleave electrode 4 extends, and the absorption axis 7a of the polarizing plate 7 is at an angle of 45° with respect to the direction in which the comb-teeth portion 5a of the interleave electrode 5 extends. However, the present invention is not limited to this. The display can be carried out with any angle ranging from 0° to 90°. This is because the bright state is realized when no electric field is applied. It is possible to obtain the bright state only by setting the alignment direction (rubbing direction) and directions of the absorption axes of the polarizing plates. Moreover, the dark state is realized by an electric field inducing phase transition which is occurred by applying an electric field to a medium so that the medium becomes optically isotropic. It is possible to obtain the dark state only by setting the absorption axes of the polarizing plates which are orthogonal to each other, and the directions of the interleave electrodes do not matter.

Therefore, in the above concrete example, the alignment treatment is not indispensable, and it is possible to carry out the display in an amorphous alignment state (random alignment state). Note that, alignment films are respectively formed onto the inner sides (counter surfaces) of the substrates 1 and 2. The alignment films are made of polyimide, and the rubbing treatment is carried out with respect to the alignment films. It is preferable that the rubbing direction be such direction that a bright state is realized in the smectic C phase. Typically, it is preferable that the rubbing direction be at an angle of about 45° with respect to the direction of the polarizing plate absorption axis.

Therefore, in the above concrete example, the alignment treatment is not indispensable, and it is possible to carry out the display in an amorphous alignment state (random alignment state). Note that, alignment films are respectively formed onto the inner sides (counter surfaces) of the substrates 1 and 2. The alignment films are made of polyimide, and the rubbing treatment is carried out with respect to the alignment films. It is preferable that the rubbing direction be such direction that a bright state is realized in the smectic C phase. Typically, it is preferable that the rubbing direction be at an angle of about 45° with respect to the direction of the polarizing plate absorption axis.

Thus, the medium A used in the display element 80 of the example embodiment may be a medium which has the optical anisotropy when no voltage is applied, and in which the optical anisotropy is lost by applying a voltage and the optical isotropy is expressed.

Moreover, the medium A may have positive dielectric anisotropy, or conversely may have negative dielectric anisotropy. Moreover, an electric field applied to the display element 80 of the example embodiment does not always have to be parallel to the substrates 1 and 2. For example, it is possible to drive the display element 80 by the electric field which is oblique with respect to the substrates 1 and 2. That is, as long as the electric field applied to the display element 80 is substantially parallel to the substrates 1 and 2, it is possible to drive the display element 80. Note that, when applying the electric field which is oblique with respect to the substrates 1 and 2, the shape of the electrode, and the arrangement position of the electrode may be suitably changed. For example, the interleave electrodes 4 and 4 may have different height (electrode thickness).

As described above, a display element according to the example embodiment is provided with a pair of substrates, at least one of which is transparent; a medium between the substrates, wherein optical anisotropy magnitude of the medium is changeable by and according to an electric field applied thereon; at least one electrode pair on one of the substrates, the at least one electrode pair including a first and a second electrodes for applying, on the medium, the electric field substantially parallel to the one of the substrates; and a third electrode provided on an other principal plane of the substrates than the principal plane on which the first and second electrodes are provided, where the principal plane is a surface of one of the substrates but the other principal plane is any one of that surface of the one of the substrates and surfaces of the other one of the substrates.

The location of third electrode is not particularly limited provided that it is provided on the other principal plane of the substrates than the principal plane on which the first and second electrodes are provided.

It is more preferable that the third electrode be provided on that facing surface of the other one of the substrates which faces against the first and second electrodes. With this arrangement, the third electrode can be in a position closer to (in a greater vicinity of) the display element in order to shield the display element from the static electricity. Hereby, it is possible to attain a higher shielding effect.

More specifically, a display element according to the example embodiment is provided with a pair of substrates, at least one of which is transparent; a medium between the substrates, wherein optical anisotropy magnitude of the medium is changeable by and according to an electric field applied thereon; at least one pair of electrodes for applying, on the medium, the electric field substantially parallel to the substrates; and an shielding electrode overlapping at least a display portion of at least one of the substrates, and used for shielding the display element from static electricity.

With this arrangement in which the shielding electrode (which is the third electrode) overlaps at least a display portion of at least one of the substrates, and is used for shielding the display element from static electricity, it is possible to shield the display element from the static electricity. Because of this, the medium dose not respond to the static electricity and thus does not fluctuate the brightness. Thus, it is possible to eliminate the display unevenness caused by the static electricity, thereby refraining and preventing deterioration in the display quality. Therefore, with this arrangement, it is possible to provide a display element that is free from the influence of the static electricity and thus is stable.

The display element is preferably arranged such that a potential of the shielding electrode (third electrode) is fixed to a constant value.

With the arrangement in which the potential of the shielding electrode is fixed to a constant value, it is possible to further ensure the shielding effect.

Moreover, the display element is preferably arranged such that the shielding electrode is provided at least on that facing surface of one of the substrates which faces against the other one of the substrate.

With the arrangement in which the shielding electrode is provided at least on that facing surface of one of the substrates which faces against the other one of the substrate, it is possible to perform the shielding operation at a position closer to (in a greater vicinity of) the medium. Hereby, it is possible to attain much higher shielding effect.

Furthermore, the shielding electrode may be patterned. In this arrangement, the shielding electrode may function as a heating section (heating means) for heating the medium. With this arrangement, it is possible to refrain and preferably prevent the display unevenness caused by the temperature unevenness. Moreover, the shielding electrode may be so formed as not to overlap the first and the second electrode (the electrode pair) when viewed from above. With this arrangement, it is possible to reduce load capacitance generated between the electrode pair (the electrodes) and the shielding electrode, thereby improving the charging property.

Moreover, the medium maybe such a medium that is optically isotropic when no electric field is applied, and becomes optically anisotropic when the electric field is applied. In this case, the shape of the refractive index ellipsoid is spherical when no electric field is applied, and becomes ellipsoidal when the electric field is applied. Moreover, the medium maybe such a medium that is optically anisotropic when no electric field is applied, and becomes optically isotropic when the electric field is applied. In this case, the shape of the refractive index ellipsoid is ellipsoidal when no electric field is applied, and becomes spherical when the electric field is applied. Furthermore, the medium may be such a medium that is optical anisotropic when no electric field is applied thereon, and that the magnitude of its optical anisotropy, which has been already existed, is changed by and according to the electric field applied thereon. In this case the ratio of the major axial length over the minor axial length of the refractive index ellipsoid is changed between before and after the electric field application (the shape of the refractive index ellipsoid may be substantially spherical).

With any of these arrangements, it is possible to change the shape of the refractive index ellipsoid depending on whether or not the electric field is applied. Thus, it is possible to perform the display operation by changing the magnitude of the optical anisotropy (orientational order parameter, refractive index, and/or the like), even though the direction of the optical anisotropy is constant. Therefore, with any of these arrangements, it is possible to realize a display element whose display state is changeable between when the electric field is applied and when no electric field is applied, and which has a wide driving (operable) temperature range, a wide viewing angle, and high-speed response capability.

Moreover, it is preferable that the medium be such a medium that have an orientational order when the electric field is applied or when no electric field is applied, the orientational order being smaller than the wavelength of visible light. That is, it is preferable that, when the electric field is applied or when no electric field is applied, the medium is not in isotropic liquid phase, but in a phase which has an order (orderly structure, orientational order) in a scale smaller than the wavelength of visible light. When the orderly structure is smaller than the wavelength of visible light, the medium is optically isotropic. Therefore, by using the medium in which the orientational order becomes smaller than the wavelength of visible light when the electric field is applied or when no electric field is applied, it is possible to change the display state between when the electric field is applied and when no electric field is applied.

The medium may have an orderly structure having a cubic symmetry.

the medium may be a material that shows cubic phase or smectic D phase.

The medium may be a liquid crystal micro emulsion.

The medium may be a lyotropic liquid crystal that shows a micelle phase, a reverse micelle phase, a sponge phase or a cubic phase.

The medium may be a liquid-crystal-particulate-dispersed system that shows a micelle phase, a reverse micelle phase, a sponge phase or a cubic phase.

The medium may be a dendrimer.

The medium may be a material that shows a cholesteric blue phase.

The medium may be a material that shows a smectic blue phase.

In any one of the materials listed above, optical anisotropy whose magnitude is changeable by and according to an electric field applied thereon. Thus, any one of the materials can be used as the medium.

Moreover, the display device according to the present invention is provided with the display element according to the present invention, as described above. Therefore, the display device of the present invention has a wide driving (operable) temperature range, a wide viewing angle, and high-speed response capability. Further, in the display device, it is possible to compensate the color phenomenon for the diagonal viewing angle occurred in the respective domains in the pixel can be compensated for each other. Thus, it is possible to improve the viewing angle property than in the conventional display devices.

As described above, the display element according to the present invention is such an excellent display element in which the wide viewing angle property and fast response property are attained (the viewing angle is wide and the response speed is fast), and the coloring phenomenon is suppressed in any directions without deteriorating the transmissivity. The display element is applicable, for example, in image display apparatus (display device) such as televisions, monitors and the like; OA apparatus such as word processors, personal computers, and the like; and image display apparatus (display device) for use in video cameras, digital cameras, information terminals such as portable phones. Moreover, the display element according to the present invention is applicable in display devices having a large screen or displaying moving pictures, because the display element according to the present invention, as described above, has the wide viewing angle property and the fast response property. In addition, the driving voltage is lower in this arrangement than in the conventional arrangement. Moreover, the fast response property of the display element allows the use of display element, for example, in a display device of field sequential color mode.

Moreover, a display device according to the present invention is provided with a display elements according to the present invention having any one of the arrangements described above. The display device thus arranged has a wide driving (operable) temperature range, a wide viewing angle property (i.e. having a wide viewing angle), and a high speed response property (i.e. be able to respond at a high speed. Furthermore, the display device thus arranged can refrain and prevent deterioration in the display quality because the display device is free from the display unevenness, which is caused by the static electricity. Therefore, the display device is applicable for large-screen display operation and moving-picture display operation.

The present invention is not limited to the embodiments discussed above and may be modified in various ways within the scope of the claims. Modifications attained by appropriate combination of technical means disclosed respectively in the different embodiments also fall into the scope of the present invention.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A display element, comprising:
a pair of substrates, at least one of which is transparent;
a medium between the substrates, wherein optical anisotropy magnitude of the medium is changeable by and according to an electric field applied thereon;
at least one electrode pair on a principal plane of one of the substrates in a given pixel region, the at least one electrode pair including a first and a second electrode interleaved with each other for applying, on the medium, the electric field substantially parallel to the one of the substrates, wherein the electric field substantially parallel to the one of the substrates is formed by the first and second electrodes; and
a transparent third electrode provided on another principal plane of the substrates than the principal plane on which the at least one electrode pair is provided, the third electrode being provided in a pattern in the pixel region where the first and second electrodes exist, in such a manner as to be between the first and second electrodes so that the third electrode does not overlap the first and second electrodes.

2. A display element as set forth in claim 1, wherein:
the third electrode is provided on that facing surface of the other one of the substrates which faces against the first and second electrodes.

3. A display element as set forth in claim 1, wherein:
a potential of the third electrode is fixed to a constant value.

4. A display element as set forth in claim 1, wherein:
the third electrode is patterned.

5. A display element as set forth in claim 4, wherein:
the third electrode functions as a shielding electrode for shielding the display element from the static electricity, and as a heating section for heating the medium.

6. A display element as set forth in claim 1, wherein:
the medium is optically isotropic when no field is applied thereon, and becomes optically anisotropic when the field is applied thereon.

7. A display element as set forth in claim 1, wherein:
the medium is optically anisotropic when no field is applied thereon, and becomes optically isotropic when a field is applied thereon.

8. A display element as set forth in claim 1, wherein:
the medium has an orientational order in a scale smaller than a wavelength of visible light when an electric field is applied or when no electric field is applied.

9. A display element as set forth in claim 1, wherein:
the medium has an orderly structure having a cubic symmetry.

10. A display element as set forth in claim 1, wherein:
the medium is a material that shows cubic phase or smectic D phase.

11. A display element as set forth in claim 1, wherein:
the medium is a liquid crystal micro emulsion.

12. A display element as set forth in claim 1, wherein:
the medium is a lyotropic liquid crystal that shows a micelle phase, a reverse micelle phase, a sponge phase or a cubic phase.

13. A display element as set forth in claim 1, wherein:
the medium is a liquid-crystal-particulate-dispersed system that shows a micelle phase, a reverse micelle phase, a sponge phase or a cubic phase.

14. A display element as set forth in claim 1, wherein:
the medium is a dendrimer.

15. A display element as set forth in claim 1, wherein:
the medium is a material that shows a cholesteric blue phase.

16. A display element as set forth in claim 1, wherein:
the medium is a material that shows a smectic blue phase.

17. A display element, comprising:
a pair of substrates, at least one of which is transparent;
a medium between the substrates, wherein optical anisotropy magnitude of the medium is changeable by and according to an electric field applied thereon;
at least one pair of electrodes interleaved with each other for applying, on the medium, the electric field substantially parallel to the substrates, wherein the electric field substantially parallel to the substrates is formed by the pair of electrodes; and
a transparent shielding electrode provided on another principal plane of the substrates than a principal plane on which the at least one electrode pair is provided, and used for shielding the display element from static electricity, the shield electrode being provided in a pattern in the pixel region where the electrode pair exists, in such a manner so as to be between the pair of electrodes so that the shielding electrode does not overlap the electrode pair.

18. A display element as set forth in claim 17, wherein:
a potential of the shielding electrode is fixed to a constant value.

19. A display element as set forth in claim 17, wherein:
the shielding electrode is provided at least on that facing surface of one of the substrates which faces against the other one of the substrate.

20. A display element as set forth in claim 17, wherein:
the medium is optically isotropic when no field is applied thereon, and becomes optically anisotropic when the field is applied thereon.

21. A display element as set forth in claim 17, wherein:
the medium is optically anisotropic when no field is applied thereon, and becomes optically isotropic when a field is applied thereon.

22. A display element as set forth in claim 17, wherein:
the medium has an orientational order in a scale smaller than a wavelength of visible light when an electric field is applied or when no electric field is applied.

23. A display element as set forth in claim 17, wherein:
the medium has an orderly structure having a cubic symmetry.

24. A display element as set forth in claim 17, wherein:
the medium is a material that shows cubic phase or smectic D phase.

25. A display element as set forth in claim 17, wherein:
the medium is a liquid crystal micro emulsion.

26. A display element as set forth in claim 17, wherein:
the medium is a lyotropic liquid crystal that shows a micelle phase, a reverse micelle phase, a sponge phase or a cubic phase.

27. A display element as set forth in claim 17, wherein:
the medium is a liquid-crystal-particulate-dispersed system that shows a micelle phase, a reverse micelle phase, a sponge phase or a cubic phase.

28. A display element as set forth in claim 17, wherein:
the medium is a dendrimer.

29. A display element as set forth in claim 17, wherein:
the medium is a material that shows a cholesteric blue phase.

30. A display element as set forth in claim 17, wherein:
the medium is a material that shows a smectic blue phase.

31. A display element as set forth in claim 17, wherein:
the shielding electrode is patterned.

32. A display element as set forth in claim 31, wherein:
the shielding electrode also functions as a heating section for heating the medium.

33. A display element as set forth in claim 31, wherein:
the shielding electrode is so formed as not to overlap the electrode pair.

34. A display device comprising:
a display element comprising:
a pair of substrates, at least one of which is transparent;
a medium between the substrates, wherein optical anisotropy magnitude of the medium is changeable by and according to an electric field applied thereon;
at least one electrode pair on a principal plane of one of the substrates in a given pixel region, the at least one electrode pair including a first and a second electrodes interleaved with each other for applying, on the medium, the electric field substantially parallel to the one of the substrates, wherein the electric field substantially parallel to the one of the substrates is formed by the electrode pair; and
a transparent third electrode provided on another principal plane of the substrates than the principal plane on which the at least one electrode pair is provided, the third electrode provided in a pattern in the pixel region where the electrode pair exists in such a manner as to be between the electrode pair so that the transparent third electrode is not overlapping the first and second electrodes as viewed from above.

35. A display device comprising: a display element including:
a pair of substrates, at least one of which is transparent;
a medium between the substrates, wherein optical anisotropy magnitude of the medium is changeable by and according to an electric field applied thereon;
at least one pair of electrodes interleaved with each other for applying, on the medium, the electric field substantially parallel to the substrates, wherein the electric field substantially parallel to the substrates is formed by the pair of electrodes; and
a transparent shielding electrode overlapping at least a display portion of at least one of the substrates, and used for shielding the display element from static electricity, the shielding electrode provided in a pattern in a pixel region where the pair of electrodes exists in such a manner so as to be between the pair of electrodes so that the shielding electrode is not overlapping the pair of electrodes as viewed from above.

* * * * *